(12) United States Patent
Colombo et al.

(10) Patent No.: US 11,993,530 B2
(45) Date of Patent: May 28, 2024

(54) PRODUCTION OF GLASS BODIES FROM POLYMERISABLE SOLUTIONS

(71) Applicant: D. Swarovski KG, Wattens (AT)

(72) Inventors: Paolo Colombo, Padua (IT); Giorgia Franchin, Padua (IT); Giulio Giometti, Treviso (IT); Johanna Schmidt, Giessen (DE); Anna De Marzi, Padua (IT)

(73) Assignee: D. Swarovski KG, Wattens (AT)

( * ) Notice: Subject to any disclaimer, the term of this patent is extended or adjusted under 35 U.S.C. 154(b) by 0 days.

(21) Appl. No.: 17/596,005

(22) PCT Filed: Jun. 5, 2020

(86) PCT No.: PCT/EP2020/065724
§ 371 (c)(1),
(2) Date: Dec. 1, 2021

(87) PCT Pub. No.: WO2020/245427
PCT Pub. Date: Dec. 10, 2020

(65) Prior Publication Data
US 2022/0324741 A1    Oct. 13, 2022

(30) Foreign Application Priority Data
Jun. 5, 2019  (EP) ..................................... 19178557

(51) Int. Cl.
*C03B 20/00*     (2006.01)
*C03B 19/06*     (2006.01)
(Continued)

(52) U.S. Cl.
CPC .............. *C03B 20/00* (2013.01); *C03B 19/06* (2013.01); *C03C 1/006* (2013.01); *C03C 3/06* (2013.01); . *C03B 2201/02* (2013.01); *C03C 2203/26* (2013.01)

(58) Field of Classification Search
None
See application file for complete search history.

(56) References Cited

U.S. PATENT DOCUMENTS

| | | |
|---|---|---|
| 2011/0163472 A1 | 7/2011 | Sepulveda et al. |
| 2019/0016622 A1 | 1/2019 | Cooper |
| 2019/0256399 A1* | 8/2019 | Annamalai ............. C03C 17/34 |

FOREIGN PATENT DOCUMENTS

| | | | |
|---|---|---|---|
| CN | 108137976 A | 6/2018 | |
| WO | WO-2017029673 A1 * | 2/2017 | ............. B33Y 70/00 |

(Continued)

OTHER PUBLICATIONS

WO 2018065093 machine translation, Rapp et al., Composition and Method for producing molded body. Apr. 2018 (Year: 2018).*

(Continued)

*Primary Examiner* — Queenie S Dehghan
(74) *Attorney, Agent, or Firm* — Stevens & Showalter LLP

(57) ABSTRACT

A method for producing a solid body of glass is described. The method comprises providing a polymerisable composition, curing the polymerisable composition to obtain a cured body, subjecting the cured body to thermal debinding to substantially remove the organic components in the cured body, and subjecting the cured body to sintering to obtain a solid body of silica glass. The polymerisable composition one or more at least partially organic polymerisable compound(s) which form a liquid composition at operating temperature and a solid source of silica as colloidal silica particles or silica glass micro-/nanoparticles dispersed in the liquid composition. The one or more at least partially organic polymerisable compounds comprises at least one organosilicon compound as a second source of silica that is liquid or solubilisable in the liquid composition at operating temperature to thereby increase the silica loading of the (Continued)

cured body prior to sintering. Compositions and methods for producing solid glass objects by additive manufacturing are also described.

24 Claims, 9 Drawing Sheets

(51) Int. Cl.
*C03C 1/00* (2006.01)
*C03C 3/06* (2006.01)

(56) References Cited

FOREIGN PATENT DOCUMENTS

| WO | 2018065093 A1 | 4/2018 |
|----|---------------|--------|
| WO | 2022232303 A2 | 11/2022 |

OTHER PUBLICATIONS

Maruska Galatioto; International Search Report and Written Opinion; International Application No. PCT/EP2020/065724; dated Sep. 11, 2020; European Patent Office; Rijswijk, Netherlands.

Pierre Friederich; Extended European Search Report; European Patent Application No. 19178557.5; dated Jan. 3, 2020; European Patent Office; Munich, Germany.

Wozniak et al.; "Highly Loaded UV Curable Nanosilica Dispersions for Rapid Prototyping Applications"; dated Aug. 1, 2009; Journal of the European Ceramic Society, Elsevier Science Publishers; Essex, Great Britain.

Zhang Xiaohui; Office Action; Chinese Patent Application No. 2020800438448; dated Feb. 18, 2023; CNIPA; Beijing, China.

Second Office Action; Chinese Patent Application No. 2020800438448; Nov. 9, 2023; CNIPA; Beijing, China.

Zhang Xiaohui; Third Office Action; Chinese Patent Application No. 2020800438448; Mar. 30, 2024; CNIPA; Beijing, China.

* cited by examiner

PRODUCTION OF GLASS BODIES FROM POLYMERISABLE SOLUTIONS

FIELD OF THE INVENTION

The invention relates to new methods for the production of solid glass bodies, and in particular highly pure silica glass bodies, from polymerisable solutions. In particular, the invention relates to methods for the production of shaped bodies of solid glass, in particular silica glass, from polymerisable solutions, such as photopolymerisable solutions, by casting or additive manufacturing. Curable compositions suitable for making solid glass objects, particularly solid silica glass objects are also provided.

BACKGROUND

Glass, and especially high-purity glasses such as fused silica glass are known to be difficult to shape, requiring large machinery for high-temperature melting and casting. This puts some practical limits on the types of objects that can be produced, and often requires large production throughputs in order to be economically viable. By contrast, in the field of polymers, new manufacturing paradigms based on additive manufacturing have emerged that offer greater design flexibility as well as options for production of small numbers of items.

While there have been some attempts to develop additive manufacturing approaches for glass objects, these typically suffer from many drawbacks, such as high surface roughness and low transparency of the samples obtained. Recently, Kotz et al. (Nature, 2017) suggested an approach using stereolithography and compositions comprising a monomeric matrix consisting primarily of hydroxyethylmethacrylate in which silica nanoparticles were dispersed. However, the silica loading in these compositions was limited by the ability to disperse the silica nanoparticles in such solutions, combined with the requirement for these compositions to comprise a sufficiently large amount of organic monomers. As a result, the objects that could be obtained using these methods show high levels of shrinkage and weight loss, thereby ultimately reducing the precision of the printing process.

It is against this background that the invention has been devised.

SUMMARY OF THE INVENTION

In a first aspect, the invention resides in a method for producing a solid body of glass. The method comprises providing a polymerisable composition comprising: a liquid composition comprising one or more at least partially organic polymerisable compound(s); and a solid source of silica chosen from colloidal silica particles, silica glass microparticles, silica glass nanoparticles and combinations thereof, dispersed in the liquid composition. The method further comprises curing the polymerisable composition to obtain a cured body, subjecting the cured body to thermal debinding to substantially remove the organic components in the cured body, and subjecting the cured body to sintering to obtain a solid body of glass. The one or more at least partially organic polymerisable compound(s) comprise(s) at least one organosilicon compound as a second source of silica to thereby increase the silica loading of the cured body prior to sintering, wherein the organosilicon compound(s) is/are chosen from silicon-based preceramic polymers/monomers and silicon alkoxides.

The present inventors have surprisingly discovered that the weight loss and shrinkage of solid glass objects obtained by polymerisation of a liquid solution, particularly silica glass, can be reduced by providing a first source of silica in solid form and a second source of silica in liquid form. At least some of these compositions also have beneficially reduced viscosities compared to compositions having similar silica loadings based only on solid silica, and all had higher silica loadings than could be achieved using polymerisable compositions according to the prior art.

According to a second aspect, the invention relates to a method for producing a solid body of glass, preferably silica glass. The method comprises providing a polymerisable composition comprising: one or more at least partially organic polymerisable compound(s) which form a liquid composition at operating temperature; and a solid source of silica as colloidal silica particles, silica glass microparticles and/or silica glass nanoparticles dispersed in the liquid composition. The method further comprises curing the polymerisable composition to obtain a cured body, subjecting the cured body to thermal debinding to substantially remove the organic components in the cured body, and subjecting the composition to sintering to obtain a solid body of silica glass. The method further comprises providing a second source of silica that is liquid or solubilisable in the liquid composition at operating temperature to thereby increase the silica loading of the cured body prior to sintering. The second source of silica comprises one or more organosilicon compounds chosen from silicon-based preceramic polymers or monomers and Si alkoxides. In some embodiments of this aspect, the further source of silica is provided in the polymerisable composition prior to curing. In some embodiments of this aspect, the further source of silica is provided by infiltrating the cured body after thermal debinding. In preferred such embodiments, the further source of silica is provided as a Si alkoxide.

According to a third aspect, the disclosure provides a method of increasing the silica loading in a cured body obtained by polymerisation of a polymerisable composition comprising one or more at least partially organic polymerisable compound(s); and a first source of silica as colloidal silica particles, glass microparticles and/or nanoparticles dispersed in the composition; the method comprising: including as part of the one or more at least partially organic polymerisable compound(s) at least one organosilicon compound as a second source of silica to thereby increase the silica loading of the cured body, wherein the organosilicon compound(s) is/are chosen from silicon-based preceramic polymers/monomers and silicon alkoxides. In embodiments of this aspect, the second source of silica is provided before, during or after curing of the cured body/polymerisable composition to be cured. In embodiments, the cured body can be processed to a solid body of glass, optionally silica glass, by thermal debinding and sintering.

According to a fourth aspect, the disclosure provides a polymerisable composition for the production of solid glass bodies, the composition comprising one or more at least partially organic polymerisable compound(s) which form a liquid composition at operating temperature, and a solid source of silica as colloidal silica particles, silica glass microparticles and/or silica glass nanoparticles dispersed in the liquid composition. The one or more at least partially organic polymerisable compound(s) comprise(s) at least one organosilicon compound as a second source of silica, wherein the organosilicon compound(s) is/are chosen from silicon-based preceramic polymers/monomers and silicon alkoxides. In embodiments, the composition can be cured to obtain a cured body. In some such embodiments, the cured body can be processed to a solid body of glass, optionally silica glass, by thermal debinding and sintering.

According to a fifth aspect, the disclosure provides a method for producing a shaped solid body of glass by additive manufacturing. The method comprises providing a polymerisable composition comprising: a liquid composition comprising one or more at least partially organic polymerisable compound(s); and a solid source of silica as colloidal silica particles, silica glass microparticles and/or silica glass nanoparticles dispersed in the liquid composition. The one or more at least partially organic polymerisable compounds comprises at least one organosilicon compound as a second source of silica, wherein the organosilicon compound(s) is/are chosen from silicon-based preceramic polymers/monomers and silicon alkoxides. The method further comprises selectively curing the composition to obtain a cured body having a desired shape. The method further comprises subjecting the cured composition to thermal debinding to substantially remove the organic components in the cured body; and subjecting the composition to sintering to obtain a solid body of glass.

According to a sixth aspect, the disclosure provides a method for producing a solid body of multicomponent glass. The method comprises providing a polymerisable composition comprising: a liquid composition comprising one or more at least partially organic polymerisable compound(s); a solid source of silica as colloidal silica particles, silica glass microparticles and/or silica glass nanoparticles dispersed in the liquid composition; and a metal or metalloid oxide precursor of a metal or metalloid selected from the group consisting of Al, Ti, Zr, Ge, Ba, Zn, B, P and La. The one or more at least partially organic polymerisable compound(s) comprise(s) at least one organosilicon compound as a second source of silica to increase the silica loading of the cured body prior to sintering, and the organosilicon compound(s) is/are chosen from silicon-based preceramic polymers/monomers and silicon alkoxides. The method further comprises curing the polymerisable composition to obtain a cured body; subjecting the cured body to thermal debinding to substantially remove the organic components in the cured body; and subjecting the cured body to sintering to obtain a solid body of multicomponent glass.

According to a seventh aspect, the disclosure provides a method for producing a shaped solid body of multicomponent glass by additive manufacturing. The method comprises: providing a polymerisable composition; selectively curing the composition to obtain a cured body having a desired shape; subjecting the cured composition to thermal debinding to substantially remove the organic components in the cured body; and subjecting the composition to sintering to obtain a solid body of multicomponent glass. According to this aspect, the polymerisable composition comprises: a liquid composition comprising one or more at least partially organic polymerisable compound(s); a solid source of silica as colloidal silica particles, silica glass microparticles and/or silica glass nanoparticles dispersed in the liquid composition; and a metal or metalloid oxide precursor comprising a metal or metalloid selected from the group consisting of Al, Ti, Zr, Ge, Ba, Zn, B, P and La; wherein the one or more at least partially organic polymerisable compound(s) comprise(s) at least one organosilicon compound as a second source of silica, and wherein the organosilicon compound(s) is/are chosen from silicon-based preceramic polymers/monomers and silicon alkoxides.

It should be understood that any of the features of any aspects or embodiments of the invention—as described further below, may and are intended to be combined with any other aspect or embodiment of the invention, and all such combinations are considered to fall within the scope of this disclosure and the inventions described herein. Purely for brevity, all such combinations, though envisaged, are not written out herein in full.

In embodiments of any aspect of the present disclosure, the solid body of glass may desirably be a solid body of silica glass. In embodiments, the sintered solid body of glass, optionally silica glass, does not contain any organic components. In embodiments, the cured body prior to sintering has a silica loading of at least 55 wt %. In embodiments, the cured body prior to sintering has a silica loading of at least 60 wt %. In embodiments, the weight loss between the cured body and the solid body of silica glass is at most 50 wt %. In embodiments of any aspect of the present disclosure, the solid body of glass is a solid body of glass comprising silica as a main constituent. For example, silica may constitute at least 70 wt %, at least 80 wt %, at least 90 wt %, at least 95 wt %, at least 98 wt %, at least 99 wt % or at least about 100 wt % of the solid body of glass. In some such embodiments, the solid body of glass is a solid body of silica glass. Within the context of the invention, a glass may be considered to be a 'silica glass' if it comprises minor amounts (e.g. a few wt %, e.g. less than 5 wt %, less than 4 wt %, less than 3 wt %, less than 2 wt %, less than 1 wt % or less than 0.5 wt %) of functional additives such as e.g. chromophores or other inorganic compounds such as refractive index modifiers etc.

In some embodiments the solid body of glass may advantageously be a multicomponent glass comprising silica as a main constituent and at least one metal/metalloid element selected from Al, Ti, Zr, Ge, Ba, Zn and La; suitably selected from Al, Ti, Zr, Ge, Ba, Zn, B, P and La; and more suitably selected from Zr, Al and/or Ge. In some embodiments the metal/metalloid oxide in the final, solid multicomponent glass comprises up to 10 wt %, up to 9 wt %, up to 8 wt %, up to 7 wt %, up to 6 wt %, up to 5 wt % or up to 4 wt % of the solid body of glass. Suitable metal oxide precursors for addition to the polymerizable glass composition include: zirconium propoxide, zirconium butoxide, germanium ethoxide, aluminium-tri-sec-butoxide, titanium butoxide, titanium ethoxide, titanium isopropoxide, barium acetate, zinc methoxide, zinc isopropoxide, boron ethoxide, boron butoxide, phosphorus ethoxide, phosphorus butoxide, lanthanum acetate hydrate, and lanthanum ethoxide.

In embodiments of any aspect of the present disclosure, the one or more at least partially organic polymerisable compound(s) form a liquid composition at the 'operating temperature' of the method. The at least one organosilicon compound is a liquid at the 'operating temperature' or is solubilisable in the liquid composition at the 'operating temperature'. Within the context of this invention, the 'operating temperature' is a temperature that is suitable for polymerisation of an at least partially organic polymerisable compound. As the skilled person would understand, such temperatures are typically significantly lower than the melting temperature of e.g. fused silica. Commonly used operating temperatures may be between −30° C. and 80° C.; e.g. between 0° C. and 50° C.; or between 15° C. and 35° C.

In embodiments of any aspect of the present disclosure, the liquid composition may further comprise an organic solvent. In embodiments, the organic solvent is liquid at operating temperature. In embodiments, the organic solvent is liquid at room temperature (approx. 20-25° C.). In embodiments, the solvent has low volatility. In embodiments, the solvent has a high boiling point and/or a low vapour pressure at operating temperature. In embodiments, the solvent has a low vapour pressure at room temperature (such as about 25° C.). For example, the solvent may advantageously have a vapour pressure at 25° C. that is below about 5 kPa. This may help to ensure that the polymerisable composition maintains a substantially constant viscosity during handling, such as e.g. during curing. In embodiments, the organic solvent has low viscosity at operating temperature. Low viscosity may be advantageous for use with additive manufacturing equipment. In embodiments, an organic solvent may be considered to have low viscosity if it has a viscosity at 25° C. that is below about 10 mPas. In embodiments, the organic solvent is selected from toluene, phenoxyethanol, isopropanol, benzylalcohol. In particularly beneficial embodiments, the organic solvent is phenoxyethanol.

In embodiments of any aspect of the present disclosure, the one or more at least partially organic polymerisable compounds are liquid at room temperature (approx. 20-25° C.).

In embodiments of any aspect of the present disclosure, the second source of silica is a liquid or is solubilisable at room temperature.

In embodiments of any aspect of the present disclosure, the one or more at least partially organic polymerisable compound(s) comprise an organic polymer, monomer or oligomer.

In embodiments of any aspect of the present disclosure, the second source of silica is beneficially solubilisable in one or more organic solvents at operating temperature. In embodiments, the second source of silica is solubilisable in one or more organic solvent selected from: toluene, phenoxyethanol, isopropanol, benzylalcohol, chloroform, tetrahydrofuran and dimethylformamide.

In embodiments of any of aspect of the present disclosure, the one or more at least partially organic polymerisable compound(s) comprises at least one curable compound. Within the context of the invention, curable compounds comprise cross-linking moieties that are able to connect polymeric chains to form three-dimensional networks. In embodiments, the composition comprises up to about 40% by weight of organic polymerisable monomer or polymer. In embodiments, the composition comprises up to about 60% by weight of Si alkoxide. In embodiments, the composition comprises at least 10% by weight of curable compound(s). In embodiments, the composition comprises up to about 40% by weight of an organic curable compound. In embodiments, the composition comprises at least one organic polymerisable compound and/or at least one organic curable compound. In some such embodiments, the organic curable compound is a diacrylate, triacrylate, tetraacrylate or mixture of diacrylates and/or triacrylates and/or tetraacrylates. In embodiments, the composition comprises a methacrylate. In embodiments, monoacrylates are selected from the group comprising: (hydroxyethyl)methacrylate (HEMA), hydroxyethylacrylate and hydroxybutyl acrylate. In embodiments, diacrylates are selected from polyethyleneglycol diacrylate (PEGDA), hydroxybutylacrylate, hexanediol diacrylate, tetra(ethylene glycol) diacrylate, tri(propylene glycol) diacrylate, bisphenol A glycerolate (1 glycerol/phenol) diacrylate, butanediol diacrylate, and poly(ethylene glycol) diacrylate). In embodiments, triacrylates are selected from trimethylolpropane triacrylate, pentaerythritol triacrylate. In embodiments, tetraacrylates are selected from di(trimethylolpropane) tetraacrylate and pentaerythritol tetraacrylate. In embodiments, the at least one organic polymer or monomer is a vinyl polymer or monomer. In embodiments, the at least one organic polymer or monomer is an epoxy polymer or monomer. Without wishing to be bound by theory, it is believed that acrylate based organic polymers/monomers may be particularly suitable for additive manufacturing applications that rely on photocuring because they tend to cure faster than e.g. vinyl based compounds.

In embodiments of any aspect of the disclosure, the composition may comprise up to about 70% by weight of colloidal silica particles, glass microparticles and/or glass nanoparticles.

In embodiments of any aspect of the disclosure, the colloidal silica particles are made from fumed silica. In some such embodiments, the colloidal silica particles are made from hydrophilic fumed silica. In embodiments, the colloidal silica particles have a diameter of between 5 and 100 nm. In embodiments, the colloidal silica particles have a specific surface area below about 100 $m^2/g$, such as between 20 and 100 $m^2/g$, or between 35 and 65 $m^2/g$. In embodiments, the composition further comprises a dispersing agent. Dispersing agents may advantageously facilitate the dispersion of colloidal silica particles which may otherwise be prone to aggregation. In embodiments, the dispersing agent is a dispersant, such as lauryl gallate, or a surfactant, such as an anionic surfactant.

In embodiments of any aspect of the disclosure, the composition comprises up to about 40% by weight of a silicon-based preceramic polymer. In embodiments, the silicon-based preceramic polymer is a polysiloxane, a polysilazane or a polycarbosilane. In embodiments, the silica-based preceramic polymer is a methyl-phenyl-polysiloxane. Suitable methyl-phenyl-polysiloxanes include the polysiloxane commercially available as SILRES® H44 from Wacker Chemie AG, and the methyl-polysiloxane available as MK from Wacker Chemie AG. As the skilled person would understand, silicon-based preceramic polymers may contain organic groups. However, in the context of this invention, the term 'silicon-based preceramic polymer' refers to polymers that include silicon in their backbones (although their backbone may not be made exclusively of silicon and may include other atoms such as C and N), whereas the term 'organic polymer' refers to organic polymers that do not include silicon in their backbones.

In embodiments of any aspect of the disclosure, the silicon alkoxide is chosen from one or more of tetraethyl orthosilicate (TEOS), methyltriethoxysilane, methyldiethoxysilane and tetramethyl orthosilicate.

In embodiments of any aspect of the present disclosure, curing the composition may be performed by supplying energy to the composition and/or by putting the polymerisable composition in contact with a chemical curing agent; preferably wherein curing the composition is performed by providing thermal energy or electromagnetic radiation. In embodiments, curing the polymerisable composition is performed at least partially by supplying energy to the composition. In embodiments, curing the polymerisable composition may be performed at least partially by putting the polymerisable composition in contact with a chemical curing agent. In embodiments, curing the polymerisable composition may be performed at least partially by providing thermal energy or electromagnetic radiation. In embodiments, curing the polymerisable composition may be performed using a combination of one or more of supplying thermal energy to the composition, supplying electromagnetic energy to the composition, and putting the polymerisable composition in contact with a chemical curing agent. In particularly beneficial embodiments, curing the composition is performed at least partially by providing energy in the form of light, preferably UV light. Accordingly, in embodiments, the composition is photopolymerisable.

In embodiments of any aspect of the present disclosure, the one or more at least partially organic polymerisable compound(s) comprises isoprene (2-methyl-1,3-butadiene). In such embodiments, curing the composition may be performed by vulcanisation.

In embodiments of any aspect of the present disclosure, the one or more at least partially organic polymerisable compound(s) comprises a siloxane comprising Si—OH groups; and curing the composition is performed by providing an alkaline environment in which the Si—OH group can undergo condensation.

In embodiments of any aspect of the present disclosure, the solution may comprise a curable silicon-based preceramic polymer and/or a curable silicon alkoxide. In some such embodiments, the solution comprises a curable silicon-based preceramic polymer and a curable organic polymer or monomer. In alternative such embodiments, the solution comprises a curable silicon-based preceramic polymer as the only curable polymer/monomer. In such embodiments, the composition may not comprise a separate curable organic polymer/monomer. In other words, all the organic crosslinking moieties present in the composition may form part of the silicon-based preceramic polymer. In embodiments, the curable silicon-based preceramic polymer is a silicon-containing monomer or polymer that comprises curable moieties, such as but not limited to acrylic, vinyl or epoxy groups.

In embodiments of any aspect of the present disclosure, the solution may comprise a curable silicon alkoxide and a curable organic polymer or monomer. In embodiments, the solution comprises a curable silicon alkoxide as the only curable polymer/monomer. In embodiments, the curable silicon alkoxide is a silicon alkoxide that comprises curable moieties, such as but not limited to acrylic, vinyl or epoxy groups.

In embodiments of any aspect of the present disclosure, the solution may comprise a curable silicon-based preceramic polymer that is a polysiloxane. In some such embodiments, the polysiloxane is a silicone acrylate, silicone methacrylate or a photocurable siloxane. Suitable silicon acrylates for use according to the invention include UV curable silicon acrylates, such as TEGO® RC711 (Evonik). Suitable methacrylates for use according to the invention include 3-(trimethoxysilyl)propyl methacrylate (also known as 3-(methacryloyloxy)propyl] trimethoxysilane). Suitable photocurable siloxane polymers include 1,3-bis(3-methacryloxypropyl)-tetrakis(trimethylsiloxy) disiloxane, which is commercially available as ABCR AB108972 from ABCR, Dowsil™ FA 4001 CM (Dow Chemical) or KER-4710-UV (Shin-Etsu Silicone).

In embodiments of any aspect of the present disclosure, the composition may further comprise a radical starter. In embodiments where curing the composition is performed by providing energy in the form of light, the composition preferably comprises a photoinitiator. In embodiments where curing the composition is performed by providing thermal energy, the composition preferably comprises a radical starter that is able to initiate the formation of radicals in the presence of heat, such as, for example, azobisisobutyronitrile. In embodiments, the composition may further comprise a photoabsorber and/or a free radical scavenger/photoinhibitor. Advantageously, the use of photoinhibitors may prevent or limit polymerisation of the composition to controlled areas within a composition while it is cured. This may enable selective polymerisation. Advantageously, the use of photoabsorbers may limit the penetration depths of the curing electromagnetic radiation, thereby increasing the resolution of selective polymerisation. In embodiments, the composition comprises a photoabsorber at a concentration of between 0.05 and 0.5% by weight of the organic crosslinking agent. In embodiments, the photoinitiator is selected from the group consisting of: bis(2,4,6-trimethylbenzoyl)-phenylphosphineoxide or 1-hydroxy-cyclohexyl-phenyl-ketone. In embodiments, the composition comprises a radical starter at a concentration of 0.5 to 4% by weight of the curable compound(s).

In embodiments of any aspect of the present disclosure, the composition may further comprise one or more functional additives. In embodiments, the composition comprises one or more chromophores. In embodiments, the Si alkoxide is provided in a solution that further comprises chromophores. In embodiments, the composition comprises one or more salts (for example nitrates, chlorides, sulfates, etc.) of d- (groups 3 to 12, transition metals) and f- (lanthanides and actinides) elements. For example, gold chloride (preferably in concentrations leading to about 0.1 wt % gold nanoparticles in the final composition), cobalt nitrate (preferably in concentrations leading to about 0.1 wt % cobalt oxide in the final composition), or erbium nitrate (preferably in concentrations leading to about 1 wt % of erbium oxide in the final composition) may be used. In embodiments, the composition comprises one or more luminescent additives. For example, the composition may comprise erbium nitrate (e.g. in concentrations leading to about 1 wt % of erbium oxide in the final composition).

In embodiments of any aspect of the present disclosure, the sintering may be performed in a normal atmosphere. In embodiments, the sintering may be performed in an oxygen enriched atmosphere. In other embodiments, sintering may be performed under vacuum.

In embodiments of the first or second aspect of the disclosure, the method may further comprise shaping the cured body prior to or during curing. In embodiments, the cured body is shaped prior to curing by casting. In embodiments, the cured body is shaped during curing by selective polymerisation or simultaneous shaping and curing. In embodiments, the method comprises selectively curing the composition by photolithography.

The methods of the invention may be particularly advantageous in combination with additive manufacturing methods such as photolithography or combined free-forming and photocuring. Indeed, the method of the invention may enable to obtain compositions comprising very high loadings of silica with adjustable viscosities, where both of these properties may be particularly important in the context of additive manufacturing. Indeed, higher silica loadings have been found by the present inventors to result in lower levels of shrinkage of the sintered object, which may be particularly advantageous when precise and complex shapes are to be made. Further, adjusting the viscosity of a composition while maintaining the ability to provide acceptable silica loadings may increase the range of additive manufacturing techniques and apparatus that can be used, where many such techniques and apparatus require specific minimum and/or maximum viscosities. In this regard, viscosity may be adjusted through changing the ratio of the solid and liquid form of silica used in accordance with the invention. For example, the major part of silica in the final composition may be provided by the solid silica component or by the liquid silica component depending on the desired viscosity. In some embodiments a higher viscosity may be achieved by providing a relatively higher loading of solid silica and a lower viscosity may be achieved by providing a relatively higher loading of liquid silica. However, viscosity may be adjusted by use of many different reagents and their interactions within the scope of the compositions described herein.

In a further aspect, the invention relates to a solid glass body obtained using the methods described herein. In embodiments, the solid glass body is a silica glass body. In other embodiments the solid glass body is a 'multicomponent' glass comprising silica and at least 1 wt %, for example, between 1 wt % and 10 wt % of a second metal or metalloid oxide component, wherein the metal may suitable be selected from Al, Ti, Zr, Ge, B, P and La.

In embodiments of any aspect of the invention, the solid glass body is beneficially transparent at wavelengths between 380 and 750 nm. In the context of the invention, transparent means that light in the visible wavelengths, such as between 380 and 750 nm can pass through the glass body without being scattered to an extent that is visible to the naked eye. As the skilled person would understand, when the glass body comprises chromophores, not all of the visible light spectrum will pass through the sample as some of it will be absorbed by the chromophores. However, the light in the 380 and 750 nm range that is not absorbed by the chromophores may advantageously pass through the glass body without being scattered to an extent that is visible to the naked eye. In embodiments, the glass body is transparent after polishing. As the skilled person would understand, depending on the production method, surface imperfections may cause a body of otherwise transparent glass to appear milky or even opaque. However, this can be remedied by polishing if (the bulk of) the material beneath the surface-polished region is indeed transparent.

For the avoidance of any doubt, embodiments of any of the aspects of the invention may comprise any of the features described in relation to any other aspect of the invention, unless such features are clearly not compatible.

BRIEF DESCRIPTION OF THE DRAWINGS

One or more embodiments of the invention will now be described, by way of example only, with reference to the appended drawings, in which:

FIG. 7A shows the sample glass body corresponding to the top curve on FIG. 4, and FIG. 7B shows the sample glass body corresponding to the lower curve on FIG. 4;

DETAILED DESCRIPTION

The present inventors have surprisingly discovered that it is possible to obtain solid glass bodies with high dimensional accuracy from a polymerisable solution, by providing a first source of silica in solid form and a second source of silica in liquid form, thereby achieving very high loadings of silica and/or allowing to balance the potentially competing requirements of silica loadings and viscosity of the composition in beneficial ways. Further, the solid glass bodies may be of high purity and may display good transparency, both of which are properties that are difficult to achieve using methods and compositions according to the prior art. In addition, secondary (minor quantities) of inorganic oxides may be included in the glass composition to create so-called multicomponent glasses. Multicomponent glasses can be tailored to provide particularly desirable or beneficial properties, such as high refractive index, e.g. the refractive index of the glass may be at least 1.54, such as between 1.54 and 1.58. Particularly useful secondary inorganic oxides are derived from metals or metalloid elements, especially one or more of Al, Ti, Zr, Ge, Ba, Zn, B, P and La. Particularly preferred secondary metals may be selected from Zr, Al and/or Ge.

Figure 1:
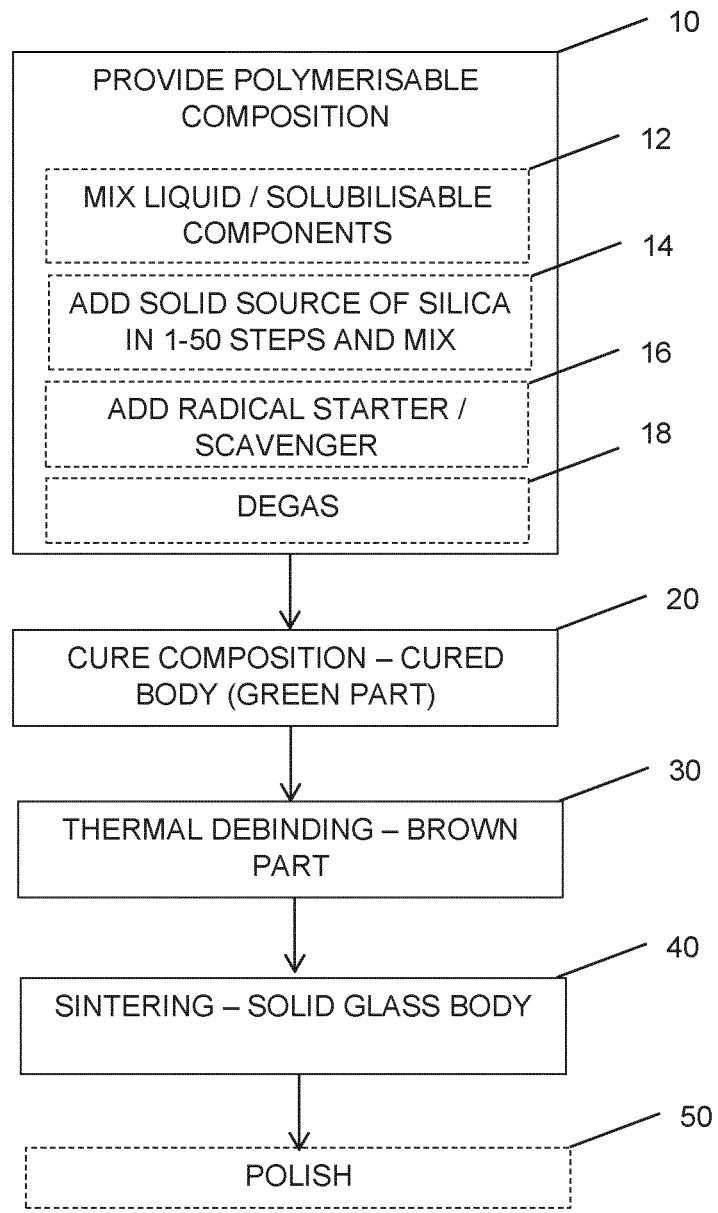
FIG. 1 shows a method for producing a solid glass body according to embodiments of the invention.

FIG. 1 shows a method for producing a solid glass body according to embodiments of the invention. The method comprises, at step 10, providing a polymerisable composition comprising: one or more at least partially organic polymerisable compound(s) which form(s) a liquid composition at operating temperature, and a first source of silica that is in solid form. The one or more at least partially organic polymerisable compounds comprise at least one organosilicon compound as a second source of silica that is liquid or solubilisable in the liquid composition at operating temperature. The one or more at least partially organic polymerisable compounds may further comprise one or more organic polymerisable monomer/polymer. Within the context of this invention, the word 'polymer' refers to molecules that comprise multiple monomers, and includes oligomers.

The first source of silica comprises colloidal silica particles, glass (suitably silica glass) micro- and/or nanoparticles, or a combination of those, dispersed in the liquid composition. Colloidal silica is typically provided as a suspension of fine amorphous, nonporous, and often spherical silica particles in a liquid phase. In the context of the invention, colloidal silica may be obtained by dispersing particles of fumed silica, such as hydrophilic fumed silica, in the composition. Particles having a specific surface area below about 100 m$^2$/g, particularly between about 20 and 100 m$^2$/g, or more specifically between about 35 and 65 m$^2$/g may be particularly suitable. Fumed silica with suitable properties is commercially available, for example, as OX50 from Aerosil®.

In embodiments, the colloidal silica particles have a diameter of between about 5 and 100 nm. Instead or in addition to fumed silica, glass micro- or nanoparticles, which may for example be obtained by grinding fused silica glass, may also be used. When such particles are used, it is preferable for them to have a size below about 10 μm, preferably below about 2 μm. Indeed, small particles may result in more homogeneous compositions and ultimately in glass bodies that are more likely to be transparent and less likely to crack during thermal processing. Within the context of the invention, microparticles may refer to particles that have characteristic dimensions in the range of 1 μm and above, such as e.g. between about 1 μm and about 500 μm, preferably between about 1 μm and about 100 μm, such as between about 1 μm and about 10 μm. Within the context of the invention, nanoparticles may refer to particles that have characteristic dimensions below about 1 μm, such as e.g. between about 5 nm and about 1,000 nm (not included).

Depending on the type of solid silica particles used, it may be beneficial for the solution to comprise a dispersing agent to facilitate the dispersion of particles which may otherwise be prone to aggregating. Dispersing agents operating on the basis of electrostatic or steric stabilisation of particles may be suitable. For example, lauryl gallate, anionic or cationic surfactants, acrylate monomers or other organic monomers that are able to minimise Van der Waals attractive forces as described in Wozniak et al. (J. Eur. Cer. Soc., 29(2009) 2259-2265) may be used. As the skilled person would understand, the amount of dispersing agent used may depend on the particles used (e.g. size and/or composition) as well as the particular dispersing agent. Typically, the smallest amount of dispersing agent that will result in a satisfactory dispersion will be used. In embodiments, the polymerisable composition comprises a dispersing agent in an amount of between about 0.05% and about 2% by weight of the solid silica particles in the polymerisable composition.

The amount of solid silica particles in the composition is typically up to about 70% by weight of the solution. Without wishing to be bound by theory, it is believed that the dispersion of large amounts of very fine silica powders in solutions may be limited by: (i) the need for a polymerisable component to be present in the composition (failing which the composition is no longer polymerisable and may only be shaped by melting of the silica particles); as well as (ii) practical upper limits associated with difficulties in dispersing or suspending such large amounts of particles in a homogeneous manner, avoiding agglomeration, and unworkable levels of viscosity. On the other hand, the use of some amount of solid silica particles has been shown to be a possible route towards obtaining solid transparent silica glass from a polymerisable solution, which has been shown in the prior art to be difficult. In some aspects and embodiments, the amount of solid silica particles in the composition is preferably at least 30% by weight of the composition; e.g. between 30% and 60% by weight of the composition; such as about 30%, about 40%, about 50% or about 60% by weight. In other aspects and embodiments, the amount of solid silica particles in the composition is preferably no more than about 30% by weight of the composition; e.g. between 2% and 25% by weight of the composition; such as about 20%, about 15%, about 10% or about 5% by weight.

The second source of silica, which is liquid or solubilisable (in the liquid composition) at operating temperature, increases the silica loading of the composition compared to a solution comprising solid silica as the only source of silica in the composition—which as explained above is limited by one or more practical and physical issues. The second source of silica comprises one or more organosilicon compound(s) selected from silicon-based preceramic polymers or monomers, and Si alkoxides. In other words, the liquid composition comprises one or more silicon-based preceramic polymer/monomer, one or more Si alkoxide, or a combination of one or more silicon-based preceramic polymer(s)/monomer(s) and one or more Si alkoxide(s). As mentioned above, the second source of silica may comprise one or more organosilicon compounds that is/are soluble in the polymerisable composition at operating temperature. As the polymerisable composition comprises a mixture of liquid at least partially organic components, it may be beneficial for the liquid or solubilisable source of silica to be miscible with or soluble in one or more organic solvent, such as, for example, in any of toluene, phenoxyethanol, isopropanol and benzylalcohol. In some aspects and embodiments, the amount of liquid silica component in the composition is preferably at least 5% by weight of the composition; for example, between 5% and 70% by weight of the composition, such as between about 30% and 70%, between about 35% and about 65% by weight, or between about 40% and 60% by weight. In other embodiments, the amount of liquid silica component in the composition may be between about 5% and about 30% by weight of the polymerisable composition, such as between about 10% and 25% by weight, or between about 15% and about 20% by weight.

The one or more secondary inorganic/metal oxide precursor may be present in an amount of about 0.1% to about 50% by weight of the polymerisable composition; such as between about 4% and about 25% by weight, or between about 8% and 20%, or between about 10% and 15% by weight. Metal oxide precursors that may be included in the polymerizable solution include one or more of: zirconium propoxide, zirconium butoxide, germanium ethoxide, aluminium-tri-sec-butoxide, titanium butoxide, titanium ethoxide, titanium isopropoxide, barium acetate, zinc methoxide and zinc isopropoxide, boron ethoxide, boron butoxide, phosphorus ethoxide, phosphorus butoxide, lanthanum acetate hydrate, and lanthanum ethoxide; particularly, zirconium butoxide, germanium ethoxide, and/or aluminium-tri-sec-butoxide.

Within the context of the invention, the 'operating temperature' is a temperature that is suitable for polymerisation of an organic polymerisable monomer or polymer. As the skilled person would understand, such temperatures are typically significantly lower than the melting temperature of e.g. fused silica. However, the operating temperature that is used in a particular embodiment of the methods of the invention may vary depending on a variety of factors such as the curing conditions used, any shaping process applied to the composition, etc. Commonly used operating temperatures may be between −30° C. and 80° C. In some embodiments, the operating temperature may be between −10° C. and 60° C., such as between 0° C. and 50° C. In some beneficial embodiments the operating temperature may be approximately 'room temperature' (i.e. approx. 20 to 25° C.).

The silicon-based preceramic polymer may be a polysiloxane, a polysilazane or a polycarbosilane. For example, the silica-based preceramic polymer may be a methyl-phenyl-polysiloxane. Suitable methyl-phenyl-polysiloxanes include the polysiloxane commercially available as SIL-RES® H44 from Wacker Chemie AG. As the skilled person would understand, silicon-based preceramic polymers may contain organic groups. However, in the context of this invention, the term 'silicon-based preceramic polymer' refers to polymers that include silicon in their backbones (although their backbone may not be made exclusively of silicon and may include other atoms such as 0, C and N); whereas the term 'organic polymer' refers to organic polymers that do not include silicon in their backbones.

The Si alkoxide may be chosen from one or more of tetraethyl orthosilicate (TEOS), methyltriethoxysilane, methyldiethoxysilane and tetramethyl orthosilicate.

Curable (e.g. photocurable, thermally curable or chemically curable) or non-curable silicon-based preceramic polymers or monomers or alkoxides may be used. When curable silicon-based preceramic polymers/monomers or alkoxides are used, the composition may not comprise a separate organic curable compound. In other words, the one or more organosilicon compounds and/or the one or more organic polymerisable compounds may comprise cross-linking moieties; such that in embodiments where the composition comprises both an organosilicon compound and an organic compound, only one may be polymerisable. Preferably, the polymerisable composition comprises at least 5% by weight of curable compounds. For example, a curable silicon-based preceramic polymer/monomer or alkoxide may be a silicon-containing monomer/polymer or alkoxide that comprises (photo)curable moieties, such as but not limited to acrylic, vinyl or epoxy groups. In embodiments, the solution may comprise a combination of a curable silicon-based preceramic polymer and/or alkoxide and an organic curable monomer or polymer. Alternatively, a curable silicon-based preceramic polymer or alkoxide may be used as the only curable component in the solution. In embodiments, the (photo)curable silicon-based preceramic polymer is a polysiloxane, such as a silicone acrylate or silicone methacrylate. Suitable silicone acrylates for use according to the invention include UV curable silicone acrylates, such as TEGO® RC711 (Evonik); 1,3-bis(3-methacryloxypropyl)tetrakis (trimethylsiloxy) disiloxane, which is commercially available as ABCR AB108972 (ABCR); Dowsil™ FA 4001 CM (Dow Chemical); or KER-4710-UV (Shin-Etsu Silicone). In embodiments, the (photo)curable silicon alkoxide is a silicone alkoxide acrylate or silicone alkoxide methacrylate. Suitable photocurable silicon alkoxides for use according to the invention include 3-(trimethoxysilyl)propyl methacrylate (also known as 3-(methacryloyloxy)propyl] trimethoxysilane).

When used, the amount of Si alkoxide in the composition is typically up to about 90% by weight of the composition. Preferably, the amount of Si alkoxide in the composition is up to about 60% by weight of the composition. Preferably, the amount of Si alkoxide in the composition is, by weight, at least about 5%, at least about 10%, at least about 15%, or at least about 20%, and at most about 60%, at most about 50%, or at most about 40%. When used, the amount of silicon-based preceramic polymer (such as e.g. (poly)siloxane) is typically up to 60% by weight of the composition. Preferably, the amount of silicon-based preceramic polymer in the composition is, by weight, at least about 5%, at least about 10%, at least about 15%, or at least about 20%, and at most about 40%, or at most about 30%. Without wishing to be bound by theory, higher values of organic content in the polymerisable composition are believed to be detrimental to the quality (e.g. density, transparency, presence/absence of defects) of the final sintered glass product. As preceramic polymers are likely to have a higher organic content than alkoxides, their maximum amount is preferably lower than that of alkoxides.

The at least one organic polymerisable monomer or polymer, when used, may contain acrylate, vinyl or epoxy moieties. Suitably, the at least one organic polymerisable monomer comprises mono-acrylates ((hydroxyethyl)methacrylate (HEMA), hydroxyethylacrylate or hydroxybutyl acrylate), diacrylates (such as polyethyleneglycol diacrylate, hydroxybutylacrylate, hexanediol diacrylate, tetra(ethylene glycol) diacrylate, tri(propylene glycol) diacrylate, bisphenol A glycerolate (1 glycerol/phenol) diacrylate, butanediol diacrylate, poly(ethylene glycol) diacrylate), triacrylates (such as trimethylolpropane triacrylate, pentaerythritol triacrylate), or tetraacrylates (such as di(trimethylolpropane) tetraacrylate, pentaerythritol tetraacrylate). Acrylate-containing materials are particularly advantageous for use in additive manufacturing due to their higher reactivity compared to vinyl or epoxy systems. Mixtures of different polymerisable components can also be used.

The polymerisable composition preferably comprises an organic solvent. The organic solvent is liquid at operating temperature. Any organic solvent that is compatible with polymerisation of the polymerisable components of the composition and that is liquid at the chosen operating temperature may be used. For example, the organic solvent may be selected from toluene, phenoxyethanol, isopropanol, benzylalcohol, chloroform, dimethylformamide, tetrahydrofuran, hexane and acetone. Phenoxyethanol (POE) may be particularly suitable. The amount of organic polymerisable monomer(s) or polymer(s) is typically below about 40% by weight of the composition. The amount of organic solvent is typically below about 20% by weight of the composition. Without wishing to be bound by theory, it is believed that both shrinkage and weight loss in the final glass body increase with the amount of organic components in the curable composition, since all organic components are preferably removed in the thermal processing of the sample (see below). Further, large amounts of organic components may be more difficult to remove from the thermally processed objects, thereby potentially resulting in loss of transparency and/or cracks appearing in the object. Further, although the organic solvent may be helpful in e.g. increasing the homogeneity of the solution and/or controlling its viscosity, the organic solvent neither contributes to setting the cured body nor forms part of the final glass body. As such, it is typically included in smaller amounts than the polymerisable and/or silicon-based components.

A three-dimensional network is generated using compounds that are capable of initiating the polymerisation or crosslinking of the organic monomer/polymer and/or the silicon-based polymer/monomer and/or the silicon alkoxide in the presence of light, heat, or a chemical agent (such as e.g. humidity). Advantageously, this enables the use of photolithographic techniques to shape a cured body obtained from the composition, as will be explained further below. This also enables the use of the composition in combined free-forming by extrusion through a nozzle and photocuring set ups, as will be explained further below.

In embodiments where the composition is photopolymerisable, it is advantageous for the composition to further comprise a radical starter, such as, for example, a photoinitiator. A photoinitiator is a compound that undergoes a photoreaction on absorption of light. The reaction produces reactive species that are capable of initiating the polymerisation of the polymers/monomers in the composition. In embodiments, the photoinitiator is selected from the group consisting of: bis(2,4,6-trimethylbenzoyl)-phenylphosphineoxide or 1-hydroxy-cyclohexyl-phenyl-ketone. In embodiments, the composition comprises a radical starter/photoinitiator at a concentration of about 0.5 to 4% by weight of the at least partially organic curable compounds (where as explained above the at least partially organic curable compounds may comprise curable organosilicon compounds and/or curable organic compounds). In embodiments, a radical starter that is able to initiate the formation of radicals (and hence polymerisation of the polymerisable/curable compounds) in the presence of heat may be used. For example, the composition may comprise azobisisobutyronitrile. In such embodiments, the azobisisobutyronitrile may be present at a concentration of about 0.5 to 4% by weight of the at least partially organic curable compounds.

In some embodiments where the composition is photopolymerisable, it may be advantageous for the composition to further comprise a photoabsorber and/or a free radical scavenger (also referred to as a photoinhibitor). Advantageously, the use of photoinhibitors may prevent or limit polymerisation of the composition outside of the intended volume, such that polymerisation is restricted to controlled regions within a composition while it is cured. The use of a photoabsorber may limit the penetration depth of curing beams. In the context of selective curing (e.g. in additive manufacturing), this may contribute to increase the resolution of the selective curing. This may enable or improve selective polymerisation. In embodiments, the composition comprises a photoabsorber at a concentration of between about 0.05 and 0.5% by weight of the curable compounds. In embodiments, a compound that absorbs light in a chosen wavelength range may be used as a photoabsorber. For example, azo dyes or food dyes may conveniently be used. Further, any dyes that may be used as a dye for printing ink may be suitable for use as a photoabsorber according to the present invention. Examples of these can be found e.g. at https://intheirtruecolors.files.wordpress.com/2016/02/ciba_orasol_brochure.pdf. Suitable free radical scavengers according to the invention include compounds that are able to inhibit the reaction between free radicals and atmospheric oxygen, thereby limiting polymerisation. In embodiments, a free radical scavenger can be selected from hydroquinone, organophosphites, and p-tert-butylcatechol (also referred to as 4-tert-butylcatechol).

In embodiments, the composition further comprises one or more functional additives. For example, the composition may comprise one or more chromophores. Chromophores can include transition metal compounds that are either liquid or soluble in organic solvents. For example, compounds including iron (e.g. ferrocene), copper, silver, or chromium (e.g. chromium acetylacetonate) may be particularly suitable. In embodiments, metal salts such as chlorides or nitrates can be used. The concentration used typically depends on the nature of the chemical and the desired optical effect. In embodiments, the polymerisable composition comprises one or more chromophores that are each at a concentration between about 0.001 wt % and about 2 wt %, such as between about 0.001 wt % and about 1 wt %—relative to the total weight of the composition. Alternatively, colloidal colouring based on either semi-conducting or metallic nanoparticles can also be carried out. In embodiments, the Si alkoxide may be provided in a solution that further comprises chromophores. In embodiments, the composition comprises one or more salts (for example: nitrates, chlorides, sulfates, etc.) of d (groups 3 to 12, transition metals) and f (lanthanides and actinides) elements. For example, gold chloride (preferably in concentrations leading to about 0.1 wt % gold nanoparticles in the final composition), cobalt nitrate (preferably in concentrations leading to about 0.1 wt % cobalt oxide in the final composition), or erbium nitrate (preferably in concentrations leading to about 1 wt % of erbium oxide in the final composition) may be used.

Step 10 may comprise the following optional substeps. At step 12, the liquid or solubilisable components, including the one or more organic polymerisable monomers or polymers (if used), the organic solvent (if used), and the liquid or solubilisable source of silica are mixed together. This may be performed by mixing the components for about 30 seconds to 5 minutes at about 200 to 2,000 rpm, for example, with a planetary centrifugal mixer. At step 14, the first source of silica is then added in multiple aliquots, such as e.g. in 1 to 50, 1 to 25, 1 to 15 or 1 to 10 portions depending on the amounts to be added. Between each addition, the solution is mixed, for example, for about 1 to 15 minutes at about 200 to 2,000 rpm. When a dispersing agent is used, this may be added together with the first source of silica. A radical starter (such as e.g. a photoinitiator) and/or a free radical scavenger (such as e.g. a photoabsorber), if used, may be added at step 16. While step 16 is depicted below/after steps 12 to 14, in practice a radical starter and/or a free radical scavenger, if used, may be added at any suitable point in providing the polymerisable composition, such as e.g. before step 14, as part of step 12, or even between separate additions (if used) in step 14. For example, when the radical starter/free radical scavenger is a solid that must be solubilised in the composition, it may be advantageous to add this during step 12 or before step 14. Further, the composition may be advantageously degassed at step 18, for example, using a planetary centrifugal mixer at about 200 to 2,000 rpm and/or by applying an at least partial vacuum. As the skilled person would understand, the composition may be degassed once or multiple times and this may occur between or after any of steps 12 to 16. Preferably, a final degassing step 18 may be used when all of the components of the polymerisable composition have been included.

At step 20, the composition is then cured to obtain a cured body. The method of curing the composition may vary depending on the identity of the curable compounds used. Curing the composition may be performed by supplying energy or by putting the composition in contact with a chemical curing agent, such as e.g. humidity or an alkaline or acid water-based solution. Preferably, curing the composition is performed by providing thermal energy or electromagnetic radiation. In particularly convenient embodiments, the composition is photocured.

In embodiments, the cured body is shaped prior to or during curing. For example, the cured body may be shaped prior to curing by casting. Alternatively, the cured body may be shaped during curing by selective polymerisation or simultaneous shaping and curing. For example, the cured body may be dispensed at a controlled rate and with a controlled geometry, and simultaneously cured as it is dispensed so as to retain the desired geometry. The present method may be particularly advantageous in combination with additive manufacturing methods such as photolithography or combined free-forming (for example, by extrusion through a nozzle) and photocuring. Indeed, the method of the invention may enable to obtain compositions comprising very high loadings of silica with adjustable viscosities, where both of these properties may be particularly important in the context of additive manufacturing. Indeed, higher silica loadings result in lower levels of shrinkage of the sintered object which may be particularly advantageous when precise and complex shapes are to be made. Further, adjusting the viscosity of a composition while maintaining the ability to provide acceptable (desirably high) silica loadings may increase the range of additive manufacturing techniques and apparatus that can be used, where many such techniques and apparatus require specific minimum and/or maximum viscosities. Free forming by extrusion through a nozzle may be performed by hand, using a robotic arm or using additive manufacturing equipment suitable for direct ink writing as known in the art.

Beneficially, the cured body prior to sintering has a silica loading of at least about 40 wt %, at least about 50 wt %, at least about 55 wt %, or at least 60 wt %. Particularly advantageously, the invention enables the cured body prior to sintering to have a silica loading of at least about 55 wt %, such as at least 60 wt %. In the context of the invention, the silica loading may be calculated as the weight percentage of silica (in silica form—$SiO_2$), that is present in the composition.

At step 30, the cured body is subjected to thermal debinding to substantially remove the organic components in the cured body. Thermal debinding may suitably comprise exposing the cured body to a temperature of between about 400° C. and about 800° C. for a period of between about 30 minutes and 6 hours, depending on the size and shape of the sample and the composition used. For example, in some embodiments thermal debinding may be performed a temperature of between about 450° C. and about 750° C. or between about 500° C. and 700° C., for a period of between about 1 hour and 4 hours, or between about 2 hours and 3 hours. Suitably, the temperature is increased from room temperature using a heating ramp of, for example, up to about 10° C./minute. Ramps of temperature in this range are believed to beneficially reduce the risk of causing cracks in the cured body due to excessively rapid heating of the organic compounds and/or release of tensions in the material. Preferably, thermal debinding is performed in a static, standard atmosphere. Alternatively, flowing oxygen enriched gases or pure oxygen gas may be used, as well as other gas compositions. In embodiments, debinding is carried out in vacuum. In such embodiments, it is beneficial for the subsequent sintering to be carried out in an oxidizing atmosphere. In embodiments, the sample may be maintained at successive steps of temperatures between about 400° C. and about 800° C., each step having a duration of between about 10 minutes and 2 hours. For example, between 1 and about 10 steps may be used. Different thermal debinding schedules may be particularly advantageous depending on the composition of the cured object. For example, the heating rate may be inversely proportional to the amount of organic compounds in the cured body (such that cured bodies having high organic contents are subject to slower increases in temperature than cured bodies having lower organic contents). Further, the heating rate may be inversely proportional to the size of the cured body (such that larger cured bodies are heated more slowly than smaller ones). In embodiments, therefore, the heating ramp may be between about 0.2° C./minute and about 12° C./minute, between about 0.3° C./minute and about 10° C./minute, or between about 0.5° C./minute and about 6° C./minute depending on the composition, size and shape of the glass body.

Optionally, debinding at step 30 may be preceded by a drying step. Drying, where necessary, may be divided into 1 to 5 different holding steps at various temperatures up to 150° C. with dwelling times of from around 1 to 120 hours; such as from about 2 to 60 hours, or from about 4 to about 30 hours, depending on the glass composition, size and shape of the cast or printed object.

At step 40, the cured body is sintered to obtain a solid body of glass, such as monocomponent silica glass or multicomponent glass. Sintering may suitably comprise exposing the cured and thermally treated body to a temperature of between about 900° C. and about 1,600° C. or between about 900° C. and about 1,550° C. for a period of between about 1 minute and 24 hours, depending on the size and shape of the sample and the composition used. In embodiments, therefore, sintering may comprise thermally treated the glass body at a temperature of about 950° C. and about 1,500° C. or between about 1,000° C. and about 1,450° C. Beneficially, the temperature is increased from room temperature/debinding temperature using a heating ramp of between about 2° C./minute and about 20° C./minute, for example, up to about 10° C./minute. Ramps of temperature in this range are believed to beneficially reduce the risk of causing cracks in the sintered body due to excessively rapid release of tensions in the material.

In embodiments, the sintering step 40 may directly follow the thermal debinding step 30, such that substantially no decrease in the temperature of the body occurs between the two steps. In embodiments, the drying step may be directly followed by the debinding step, which may be directly followed by the sintering step such that there is effectively a single heating stage with no cooling taking place between each phase.

Preferably, sintering is performed in a static, standard atmosphere. Alternatively, flowing oxygen enriched gases or pure oxygen gas may be used, as well as other gas compositions. In embodiments, sintering can be carried out in vacuum. In embodiments, the sample may be maintained at successive steps of temperatures (such as e.g. between 1 and about 10 steps) between about 900° C. and about 1,550° C., each step having a duration of between about 1 minute and 24 hours. Different sintering schedules may be particularly advantageous depending on the composition, and/or the shape/size of the cured object. For example, the heating rate may be inversely proportional to the size of the cured body (such that larger cured bodies are heated more slowly than smaller ones). As the skilled person would understand, the minimum time required for sintering the brown part is linked to the temperature used, such that shorter times may be used in combination with higher temperatures, if such higher temperatures do not cause technical or practical problems (e.g. cracks, haziness due to crystallisation) with the item. Multicomponent glasses may be sintered at lower temperatures than monocomponent silica glass; e.g. up to about 1,500° C., up to about 1,350° C. or up to about 1,200° C., and heating to the maximum sintering temperature may be carried out in stages of approx. 20° C. with dwell times (e.g. of between about 1 minute and 24 hours; between about 2 mins and about 8 hours, or between about 5 mins and about 1 hours) at each successively higher temperature.

Desirably, the resultant solid body of silica or multicomponent glass does not contain any organic components. Advantageously, the weight loss between the cured body (after step 20) and the solid body of silica or multicomponent glass (after step 40) is at most about 50%, or at most about 45%. In beneficial embodiments, the weight loss between the cured body (after step 20) and the solid body of silica or multicomponent glass (after step 40) is at most about 40%.

Advantageously, the methods and compositions of the invention may enable to obtain solid silica or multicomponent glass bodies that are transparent at wavelengths between 380 and 750 nm.

In the context of the invention, transparent means that light in the visible wavelengths, such as between 380 and 750 nm can pass through the glass body without being scattered to an extent that is visible to the naked eye. As the skilled person would understand, when the glass body comprises chromophores, not all of the visible light spectrum will pass through the sample as some of it will be absorbed by the chromophores. However, the light in the 380 and 750 nm range that is not absorbed by the chromophores may advantageously pass through the glass body without being scattered to an extent that is visible to the naked eye.

In embodiments, the glass body is transparent after polishing. Therefore, the method may further comprise an optional step 50 of polishing the solid glass body. As the skilled person would understand, depending on the production method, surface imperfections may cause a body of otherwise transparent glass to appear milky or even opaque. However, this may be remedied by polishing if the bulk of the material (e.g. that below the layer of glass to be polished) is indeed transparent. In embodiments, instead or in addition to being polished, the solid glass body may be etched, painted or otherwise coated.

In embodiments, a further optional step is performed before step 40, wherein a further second source of silica is provided by infiltrating the cured body before sintering. In such embodiments, the further second source of silica is provided as a Si alkoxide, as described above. In embodiments, a second source of silica is not, or may not necessarily be provided in the composition prior to curing, and the increase in silica loading can instead be achieved by infiltrating the cured body. In some embodiments the second source of silica may be provided prior to curing and may also be used to infiltrate the cured body after curing, thereby to further increase the silica loading of the solid glass body. In embodiments, the second source of silica may be provided by immersing the cured (and debinded) body in a Si alkoxide; suitably in a pure Si alkoxide. Preferably, the infiltration is performed under vacuum in order to remove gasses (e.g. air) that may be trapped in pores of the cured body to encourage infiltration with liquid reagent. Advantageously, the immersion may be maintained for at least about 5 minutes, and/or up to about 30 minutes.

The compositions according to the invention may advantageously be stable, at least without the photoinitiator (if present) or in the absence of light if the composition is photopolymerisable.

The invention will now be illustrated by way of the following non-limiting examples.

EXAMPLES

Example 1

In this example, the inventors produced solid glass bodies using methods and compositions according to embodiments of the invention and comparative compositions, in order to investigate whether the methods and compositions of the invention could result in lower shrinkage/weight loss in the final object compared to the prior art.

Unless indicated otherwise, all compositions were prepared by mixing the liquid or solubilisable components (apart from the photoinitiator) for 30 seconds to 5 minutes at 200 to 2,000 rpm with a planetary centrifugal mixer. Silica powder was then added in 1 to 15 steps, with mixing for 1 to 15 minutes at 200 to 2,000 rpm between each addition. A photoinitiator (bis(2,4,6-trimethylbenzoyl)-phenylphosphineoxide or 1-hydroxy-cyclohexyl-phenyl-ketone) was then added at concentrations of 0.5 to 4 wt % of the diacrylate or curable silica-based polymer. The solutions were then degassed using a planetary centrifugal mixer at 200 to 2,000 rpm and/or a vacuum pump.

Unless indicated otherwise, all compositions were prepared using bis(2,4,6-trimethylbenzoyl)-phenylphosphineoxide as a photoinitiator. The concentration of the photoinitiator was typically about 2 wt % relative to the weight of the photocurable compounds (e.g. PEGDA).

A comparative composition according to the prior art was prepared comprising the following ingredients by weight %: 34.0% (hydroxyethyl)methacrylate (HEMA, organic monomer); 3.7% poly(ethylene glycol) diacrylate (PEGDA, photocurable monomer); 50.0% OX50 (colloidal silica from Aerosil®, hydrophilic fumed silica, https://products-re.evonik.com/www2/uploads/productfinder/AEROSIL-OX-50-EN.pdf); and 12.3% phenoxyethanol (POE, solvent).

A total of four different samples were shaped by soft lithography: the samples were cast and photopolymerised in a UV oven for 2 to 15 minutes to obtain a 'green part'. The dimensions of the samples varied between about 10×7×7 mm and about 10×7×4 mm. Unless indicated otherwise, these conditions and dimensions were also used for the samples according to the invention shown throughout the Examples of this disclosure.

The samples were then subjected to thermal debinding (resulting in a 'brown part'), according to the following schedule: temperature ramp 0.2° C./min from room temperature to 420° C., 3 h of dwelling, temperature ramp of 0.3° C./min up to 570° C., 3 h of dwelling, temperature ramp of 0.3° C./min up to 700° C., 3 h of dwelling. Debinding schedules comprising a temperature ramp of 0.1° C./min from room temperature to 700° C. followed by 3 hours of dwelling at 700° C. were also successfully used (results not shown).

The samples were then subjected to sintering according to the schedule provided in Table 1 below (resulting in a solid, highly pure silica glass body). In the standard (tube) furnace the samples are cooled in the closed oven until reaching room temperature—about 12 hours. In the bottom loading furnace the samples were cooled faster—less than 2 hours. No differences between the samples sintered in the tube furnace and the bottom loading oven were detected upon visual inspection.

The weight loss (difference between the weight of the green part and the weight of the glass body) was quantified for each sample, as were the linear and volumetric shrinkages (shrinkage between the green part and the glass body). The linear shrinkage was obtained by measuring the size of the samples along 3 orthogonal dimensions using a digital caliper and calculating for each dimension: ((length after UV curing−length after sintering)/length after UV curing)× 100. The results of this are shown in Table 1 below, where the standard deviation for the linear shrinkage reflects the fact that 3 dimensions are measured for each sample. The volumetric shrinkage was obtained by calculating 100* (volume after curing−volume after sintering)/(volume after curing), where the volumes are obtained by multiplying the measured size of the samples along the three orthogonal dimensions as explained above. Weight loss is expected to provide a more reliable indication of the shrinkage of the bodies since the linear and volumetric shrinkage can suffer from variations due to irregularities in the surface of the bodies leading to variable length measurements.

TABLE 1

Shrinkage and sintering schedules for comparative samples

| Sample ID | Linear shrinkage (%) | Volumetric shrinkage (%) | Weight Loss (%) | Sintering schedule |
|---|---|---|---|---|
| 1 | 28.9 ± 1.7 | 64.0 | 51.2 | Ramp 10° C./min from room temperature Plateau 1,150° C., 16 h (standard furnace) |
| 2 | 27.8 ± 1.2 | 62.4 | 51.3 | Ramp 15° C./min from room temperature Plateau 1,400° C., 10 min (bottom-loading furnace) |
| 3 | 29.4 ± 1.4 | 64.8 | 51.4 | Ramp 15° C./min from room temperature Plateau 1,350° C., 10 min (bottom-loading furnace) |
| 4 | 29.5 ± 0.7 | 65.0 | 51.2 | Ramp 15° C./min from room temperature Plateau 1,400° C., 10 min (bottom-loading furnace) |
| Mean ± st. dev. | 28.9 ± 0.8 | 64.1 ± 1.2 | 51.3 ± 0.1 | |

A composition according to embodiments of the invention using a silica alkoxide as a liquid source of silica was prepared, comprising the following ingredients by weight %: 24.7% (hydroxyethyl)methacrylate (HEMA, organic monomer); 5.88% poly(ethylene glycol) diacrylate (PEGDA, photocurable monomer); 50.0% OX50 (colloidal silica from Aerosil®, hydrophilic fumed silica, https://products-re.evonik.com/www2/uploads/productfinder/AEROSIL-OX-50-EN.pdf); 9.42% phenoxyethanol (POE, solvent); and 10.0% tetraethyl orthosilicate (TEOS, silica alkoxide, providing about 5% $SiO_2$ by weight of the total composition).

A total of two different samples were cast and polymerised to obtain a 'green part'. The samples were then subjected to thermal debinding (resulting in a 'brown part') as explained above for samples 1 to 4, and sintering according to the schedule provided in Table 2 below (resulting in a solid, highly pure silica glass body). The weight loss (difference between the weight of the green part and the weight of the glass body) was quantified for each sample, as were the linear and volumetric shrinkages (shrinkage between the green part and the glass body). The results of this are shown in Table 2 below.

TABLE 2

Shrinkage and sintering schedules for samples according to embodiments of the invention

| Sample ID | Linear shrinkage (%) | Volumetric shrinkage | Weight Loss (%) | Sintering schedule |
|---|---|---|---|---|
| 5 | 27.8 ± 0.5 | 63.2 | 47.7 | Ramp 10° C./min from RT Plateau 1150° C., 16 h (standard furnace) |
| 6 | 28.3 ± 0.5 | 62.4 | 48.2 | Ramp 15° C./min from RT Plateau 1400° C., 10 min (bottom-loading furnace) |
| Mean ± st. dev. | 28.1 ± 0.3 | 62.8 ± 0.5 | 48.0 ± 0.3 | |

The results in Table 2 show that on average, samples according to embodiments of the invention have a lower shrinkage (28.1±0.3 vs. 28.9±0.8) and weight loss (48.0±0.3 vs. 51.3±0.5) compared to samples according to the prior art. Further, comparing samples 1 (comparative, shrinkage 28.9) and 5 (invention, shrinkage 27.8) and samples 2 and 4 (average shrinkage 28.65) and 6 (invention, shrinkage 28.3) indicates that this effect is independent of the sintering schedule used. Further, the average volumetric shrinkage for samples 5 and 6 was calculated as 62.8±0.5% (compared to 64.1±1.2% for samples 1 to 4). As mentioned above, shrinkage data is expected to be less reliable than weight loss data due to the presence of slight irregularities in the shape of the samples.

A few physical properties of sample 5 were additionally measured in order to verify the quality of the solid silica glass bodies obtained using the compositions and methods according to embodiments of the invention. In particular, the density of the sample was measured as 2.201 $g/cm^3$; the refractive index nD at 589.3 nm was measured using a Kruss refractometer as 1.4584; and the micro hardness was measured using the Vickers method as 8,600 to 9,800 $N/mm^2$. All of these measurements indicate that the glass bodies obtained using the compositions and methods according to embodiments of the invention are solid silica glass bodies as they have the expected properties for such glass. All of samples 1 to 4 had a similar density of about 2.100 g/cc, presumably due to residual air trapped in the cured bodies because of the high viscosity of the composition prior to curing.

A composition according to embodiments of the invention using a preceramic polymer dissolved in the liquid composition as a liquid source of silica was prepared, comprising the following ingredients by weight %: 25.12% (hydroxyethyl)methacrylate (HEMA, organic monomer); 5.28% poly(ethylene glycol) diacrylate (PEGDA, crosslinking monomer); 50.0% OX50 (colloidal silica from Aerosil®, hydrophilic fumed silica, https://products-re.evonik.com/www2/uploads/productfinder/AEROSIL-OX-50-EN.pdf); 9.63% phenoxyethanol (POE, solvent); and 9.97% Wacker Silres® H44 (silicone resin, methyl-phenyl-silsesquioxane, providing about 5% $SiO_2$ by weight of the total composition).

A total of four different samples were cast and polymerised to obtain a 'green part'. The samples were then subject to thermal debinding (resulting in a 'brown part') as explained above in relation to samples 1 to 4, and sintering according to the schedule provided in Table 3 below (resulting in a solid, highly pure silica glass body). The weight loss (difference between the weight of the green part and the weight of the glass body) was quantified for each sample, as was the linear shrinkage (shrinkage between the green part and the glass body). The results of this are shown in Table 3 below.

TABLE 3

Shrinkage and sintering schedules for samples according to embodiments of the invention

| Sample ID | Linear shrinkage (%) | Weight Loss (%) | Sintering schedules |
|---|---|---|---|
| 7 | 27.1 ± 0.5 | 46.1 | Ramp 10° C./min from RT Plateau 1,150° C., 16 h (standard furnace) |

TABLE 3-continued

Shrinkage and sintering schedules for samples according to embodiments of the invention

| Sample ID | Linear shrinkage (%) | Weight Loss (%) | Sintering schedules |
|---|---|---|---|
| 8 | 25.4 ± 2.5 | 46.3 | Ramp 15° C./min from RT Plateau 1,400° C., 10 min (bottom-loading furnace) |
| 9 | 28.0 ± 0.8 | 46.4 | Ramp 15° C./min from RT Plateau 1,350° C., 10 min (bottom-loading furnace) |
| 10 | 26.2 ± 1.2 | 46.3 | Ramp 15° C./min from RT Plateau 1,400° C., 10 min (bottom-loading furnace) Faster cooling |
| Mean ± st. dev. | 26.7 ± 1.1 | 46.3 ± 0.1 | |

The results in Table 3 show that on average, samples according to embodiments of the invention have a lower shrinkage (26.7±1.1 vs. 28.9±0.8) and weight loss (46.3±0.1 vs. 51.3±0.5) compared to samples according to the prior art. Further, comparing samples 1 (comparative, shrinkage 28.9) and 7 (invention, shrinkage 27.1) and samples 2 and 4 (average shrinkage 28.65) and 8 and 10 (invention, average shrinkage 25.8) indicates that this effect is independent of the sintering schedule used. Further, the average volumetric shrinkage for samples 7 to 10 was calculated as 60.5±1.8% (compared to 64.1±1.2% for samples 1 to 4). This confirms that samples according to embodiments of the invention have a lower shrinkage than samples according to the prior art.

A few physical properties of sample 7 were additionally measured in order to verify the quality of the solid silica glass bodies obtained using the compositions and methods according to embodiments of the invention. In particular, the density of the sample was measured as 2.186 g/cm$^3$; the refractive index nD at 589.3 nm was measured using a Kruss refractometer as 1.46; and the micro hardness was measured using the Vickers method as 8,894 N/mm$^2$. All of these measurements indicate that the glass bodies obtained using the compositions and methods according to embodiments of the invention are solid silica glass bodies as they have the expected properties for such glass.

Figure 2A:
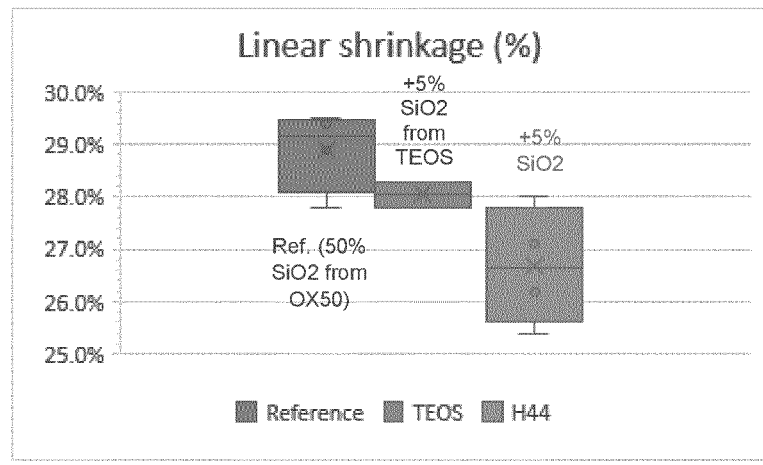
FIGS. 2A and 2B show shrinkage (FIG. 2A) and weight loss (FIG. 2B) for samples according to embodiments of the invention and comparative samples.
Figure 2B:
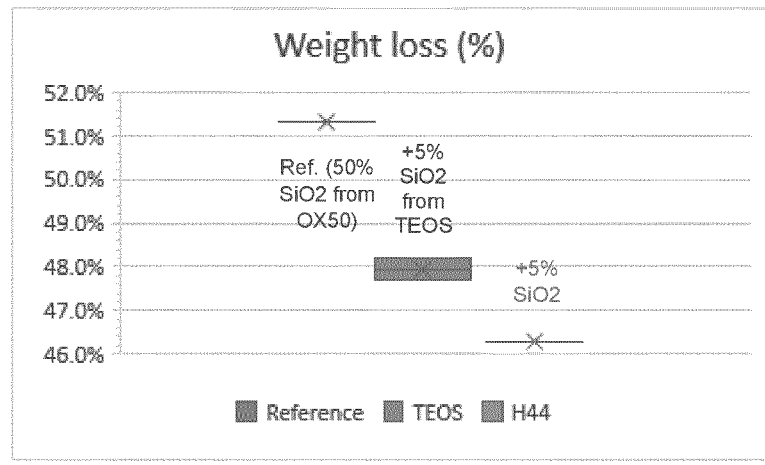

FIGS. 2A and 2B summarise the data shown in Tables 1, 2 and 3, respectfully for shrinkage (FIG. 2A) and weight loss (FIG. 2B). The data in those figures shows that the samples according to embodiments of the invention have lower shrinkage and weight loss than comparative samples.

Example 2

In this example, the inventors further investigated the effects of increasing the silica loading/content of a curable glass composition using a liquid source of silica. Therefore, compositions according to the invention including about 10% SiO$_2$ by weight of the total composition from a liquid silica solution in addition to the 50% weight colloidal silica were prepared.

In particular, a composition according to embodiments of the invention using a silica alkoxide as a liquid source of silica was prepared, comprising the following ingredients by weight %: 17.50% (hydroxyethyl)methacrylate (HEMA, organic monomer); 4.25% poly(ethylene glycol) diacrylate (PEGDA, crosslinking monomer); 50.00% OX50 (colloidal silica from Aerosil®, hydrophilic fumed silica, https://products-re.evonik.com/www2/uploads/productfinder/AERO-SIL-OX-50-EN.pdf); 7.00% phenoxyethanol (POE, solvent); and 21.25% tetraethyl orthosilicate (TEOS, silica alkoxide, providing about 10% SiO$_2$ by weight of the total composition).

A further composition according to embodiments of the invention using a preceramic polymer dissolved in the liquid composition as a liquid source of silica was prepared, comprising the following ingredients by weight %: 18.68% (hydroxyethyl)methacrylate (HEMA, organic monomer); 4.22% poly(ethylene glycol) diacrylate (PEGDA, crosslinking monomer); 50.03% OX50 (colloidal silica from Aerosil®, hydrophilic fumed silica, https://products-re.evonik.com/www2/uploads/productfinder/AEROSIL-OX-50-EN.pdf); 8.0% phenoxyethanol (POE, solvent); and 19.06% Wacker Silres® H44 (silicone resin, methyl-phenyl-silsesquioxane, providing about 10% SiO$_2$ by weight of the total composition).

The two samples were cast and polymerised to obtain a 'green part'. The samples were then subjected to thermal debinding (resulting in a 'brown part') as explained above in relation to samples 2 to 4, and sintering according to the schedule provided in Table 4 below (resulting in a solid, highly pure silica glass body). The weight loss (difference between the weight of the green part and the weight of the glass body) was quantified for each sample, as was the linear shrinkage (shrinkage between the green part and the glass body). The results of this are shown in Table 4 below, where sample 2/1 is the sample comprising TEOS and sample 2/2 is the sample comprising H44.

TABLE 4

Shrinkage and sintering schedules for samples according to embodiments of the invention

| Sample ID | Linear shrinkage (%) | Weight Loss (%) | Notes |
|---|---|---|---|
| 2/1 | 28.0 ± 1.0 | 42.2 ± 1.9 | Ramp 15° C./min from RT Plateau 1,400° C., 10 min (bottom-loading furnace) |
| 2/2 | 23.9 ± 0.8 | 41.0 ± 0.1 | Ramp 15° C./min from RT Plateau 1,400° C., 10 min (bottom-loading furnace) |

The average volumetric shrinkage for samples 2/1 was calculated 62.6±1.3%. The average volumetric shrinkage for samples 2/2 was calculated as 55.8±2.8%.

The data in Table 4 shows that the linear shrinkage and weight loss of the sintered silica glass objects can be further decreased by including larger amounts of liquid silica. In particular, the use of a preceramic polymer (H44) contributing 10% SiO$_2$ by weight results in a linear shrinkage of 23.9±0.8% (volumetric shrinkage 55.8±2.8%) compared to 26.7±1.1% (volumetric shrinkage 60.5±1.8%) with the preceramic polymer (H44) contributing 5% SiO$_2$ by weight, and 28.9±0.8% (volumetric shrinkage 64.1±1.2%) without any preceramic polymer. Similarly, the use of a preceramic polymer (H44) contributing 10% SiO$_2$ by weight results in a weight loss of 41.0±0.1% compared to 46.3±0.6% with the preceramic polymer (H44) contributing 5% SiO$_2$ by weight, and 51.3±0.5% without any preceramic polymer. Comparing samples 2/2, 8, 10 (invention), and samples 2 and 4 shows that this result is independent of the sintering schedule.

Similarly, the use of a Si alkoxide contributing 10% SiO$_2$ by weight results in a shrinkage of 28.0±1.0% (volumetric shrinkage 62.6±1.3%) compared to 28.1±0.3% (volumetric shrinkage 62.8±0.5%) with the Si alkoxide contributing 5% SiO$_2$ by weight, and 28.9±0.8% (volumetric shrinkage 64.1±1.2%) without any Si alkoxide, indicating that the shrinkage is at least more consistently lower when the amount of Si alkoxide is increased. Similarly, the use of a Si alkoxide contributing 10% $SiO_2$ by weight results in a weight loss of 42.2±1.9% compared to 48.0±0.3% with the Si alkoxide contributing 5% $SiO_2$ by weight, and 51.3±0.5% without any Si alkoxide. Comparing samples 2/1, 6 (invention), and samples 2 and 4 again shows that this result is independent of the sintering schedule.

Figure 3A:
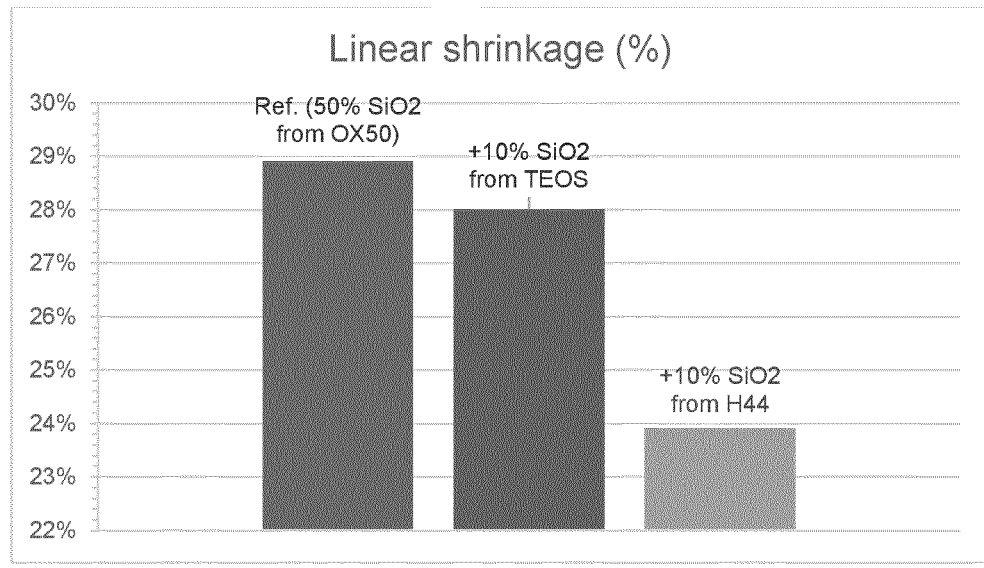
FIGS. 3A and 3B show shrinkage (FIG. 3A) and weight loss (FIG. 3B) for samples according to embodiments of the invention and comparative samples.
Figure 3B:
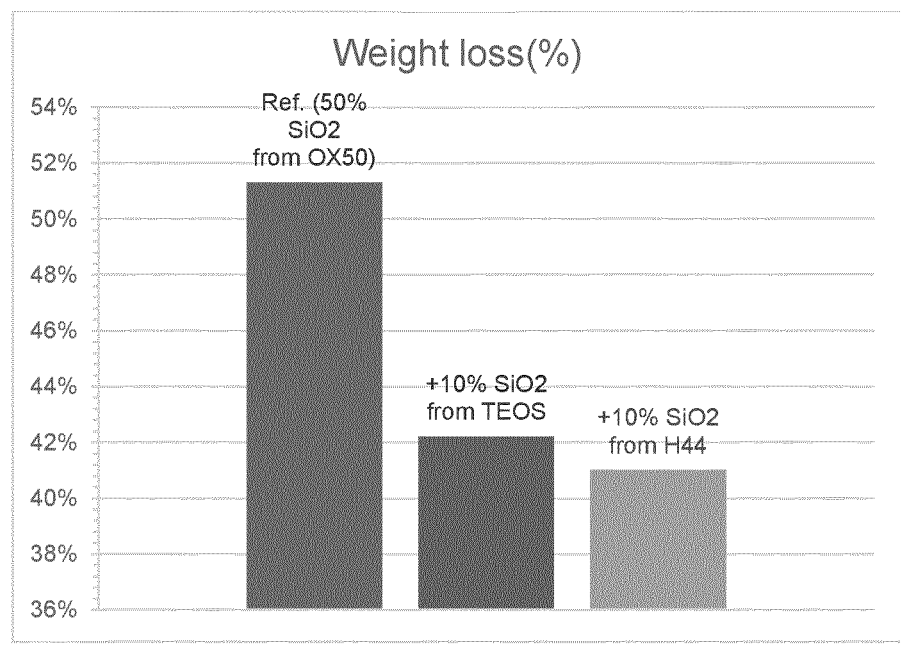

FIGS. 3A and 3B summarise the data in Table 4, respectfully for linear shrinkage (FIG. 3A) and weight loss (FIG. 3B). The data in those figures shows that the samples according to embodiments of the invention have lower shrinkage and weight loss than comparative samples, and that this effect is scalable at least in the ranges tested.

A few physical properties of sample 2/1 were additionally measured in order to verify the quality of the solid silica glass bodies obtained using the compositions and methods according to embodiments of the invention. In particular, the micro hardness of this sample was measured using the Vickers method as 8,731±785 $N/mm^2$. These measurements indicate that the glass bodies obtained using the compositions and methods according to embodiments of the invention are solid silica glass bodies as they have the expected properties for such glass.

Example 3

In this example, the inventors investigated the use of different organic components (such as different organic monomers and solvents) to those of Examples 1 and 2. Different solvents and organic monomers may advantageously be used depending on the intended forming process, for example, for compatibility with a particular additive manufacturing machine or polymerisation process.

In particular, a composition (referred to herein as sample 2/3) according to embodiments of the invention using a preceramic polymer dissolved in the liquid composition as a liquid source of silica was prepared, comprising the following ingredients by weight %: 9.70% (hydroxyethyl)methacrylate (HEMA, organic monomer); 9.75% benzyl alcohol (solvent), 4.10% poly(ethylene glycol) diacrylate (PEGDA, crosslinking monomer); 49.98% OX50 (colloidal silica from Aerosil®, hydrophilic fumed silica, https://products-re.evonik.com/www2/uploads/productfinder/AEROSIL-OX-50-EN.pdf); 7.45% phenoxyethanol (POE, solvent); and 19.04% Wacker Silres® H44 (silicone resin, methylphenyl-silsesquioxane, providing about 10% $SiO_2$ by weight of the total composition).

This sample was cast, polymerised, subjected to thermal debinding as explained above in relation to samples 1 to 4, and sintered according to the following schedule: ramp 15° C./min from RT, plateau 1,400° C., 10 min (bottom-loading furnace). The weight loss (difference between the weight of the green part and the weight of the glass body) was quantified as 40.7%, and the linear and volumetric shrinkages (shrinkage between the green part and the glass body) were quantified as 24.7±1.4% and 57.3%, respectively. These results demonstrate that the results above also apply to systems using different organic components, and in particular to systems using a reduced amount of curable component (e.g. HEMA).

A few physical properties of this sample were additionally measured in order to verify the quality of the solid silica glass bodies obtained using the compositions and methods according to embodiments of the invention. In particular, the micro hardness of this sample was measured using the Vickers method as 8,829±785 $N/mm^2$. These measurements indicate that the glass bodies obtained using the compositions and methods according to embodiments of the invention are solid silica glass bodies and possess the expected properties for such glass.

Further compositions according to embodiments of the invention using preceramic polymers and/or silicon alkoxides as a source of liquid silica were prepared, comprising the following ingredients by weight %:

Samples: 24, 26, 27: 30 wt % OX 50+10 wt % $SiO_2$ from TEOS:
  these samples comprised 21.30 wt % TEOS, 32.30 wt % HEMA, 12.02 wt % POE, 5.00 wt % PEGDA 700, and 29.48 wt % OX50.
Samples: 21, 22, 23: 30 wt % OX 50+10 wt % $SiO_2$ from H44:
  these samples contained 19.05 wt % H44, 33.19 wt % HEMA, 12.38 wt % POE, 5.00 wt % PEDGA 700, and 30.38 wt % OX50.
Sample: 28: 30 wt % OX 50+5 wt % $SiO_2$ from TEOS+5 wt % $SiO_2$ from H44:
  this sample contained 10.65 wt % TEOS, 9.53 wt % H44, 44.82 wt % HEMA, 5.00 wt % PEGDA 700, and 30.00 wt % OX50.

These samples were cast, polymerised (soft lithography), subjected to thermal debinding as explained above in relation to samples 1-4, and sintered according to the following schedule: ramp 15° C./min from RT, plateau 1,400° C., 10 min (bottom-loading furnace). The following values were measured for the linear shrinkage, the volumetric shrinkage and the weight loss:

TABLE 5

Shrinkage values for samples according to embodiments of the invention

| Composition (sample number) | Linear shrinkage (%) | Volume shrinkage (%) | Weight loss (wt %) |
| --- | --- | --- | --- |
| 24, 25, 26 - 30 wt % OX 50 + 10 wt % $SiO_2$ from TEOS | 39.4 ± 1.3 | 71.8 ± 0.3 | 60.6 ± 0.1 |
| 21, 22, 23 - 30 wt % OX 50 + 10 wt % $SiO_2$ from H44 | 33.9 ± 1.4 | 71.1 ± 1.8 | 60.6 ± 0.1 |
| 28 - 30 wt % OX 50 + 5 wt % $SiO_2$ from TEOS + 5 wt % $SiO_2$ from H44 | 34.7 ± 0.6 | 72.3 | 62.3 |

Example 4

In this example, the inventors investigated whether the shrinkage and weight loss of objects obtained using polymerisable solutions comprising very high loadings of solid silica could be further improved using an additional liquid source of silica, in particular an Si alkoxide.

A composition according to the prior art was prepared comprising the following ingredients by weight %: 28.6% (hydroxyethyl)methacrylate (HEMA, organic monomer); 3.1% poly(ethylene glycol) diacrylate (PEGDA, crosslinking monomer); 57.5% OX50 (colloidal silica from Aerosil®, hydrophilic fumed silica, https://products-re.evonik.com/www2/uploads/productfinder/AEROSIL-OX-50-EN.pdf); and 10.8% phenoxyethanol (POE, solvent). Without wishing to be bound by theory, it is believed that such high loadings of solid silica are closest to the highest amounts that can be obtained in a stable, polymerisable solution. This results in highly viscous samples that are very difficult to manipulate, and in particular that are not amenable to additive manufacturing using currently available technologies.

This sample was cast, polymerised, subjected to thermal debinding as explained above in relation to samples 1 to 4, and sintered according to the following schedule: ramp 15° C./min from RT, plateau 1,400° C., 10 min (bottom-loading furnace). The weight loss (difference between the weight of the green part and the weight of the glass body) was quantified as 43.6±0.3%, and the linear shrinkage (shrinkage between the green part and the glass body) was quantified as 24.8%±0.5.

The same composition as above was then used to cast a second sample, which was polymerised and subjected to thermal debinding as explained above in relation to samples 1 to 4, then infiltrated with TEOS. In particular, the sample was immersed in pure TEOS under a vacuum for 30 minutes; however, in other methods within the scope of the invention the sample may be immersed in TEOS or other desirable liquid source of silica for any convenient time period—for example, between about 5 mins and 60 mins. The use of a vacuum may contribute to removing air trapped in the pores of the sample. The infiltrated sample was then sintered according to the following schedule: ramp 15° C./min from RT, plateau 1,400° C., 10 min (bottom-loading furnace). The weight loss (difference between the weight of the green part and the weight of the glass body) was quantified as 37.4%, and the linear shrinkage (shrinkage between the green part and the glass body) was quantified 23.8±0.5%. This data shows that further reductions of weight loss and shrinkage can be obtained even when using as a starting point the samples with the highest loadings of solid silica available in the prior art, by using the methods of the invention.

A few physical properties of this sample were additionally measured in order to verify the quality of the solid silica glass bodies obtained using the compositions and methods according to embodiments of the invention. In particular, the refractive index nD at 589.3 nm was measured using a Kruss refractometer as 1.46, and the micro hardness was measured using the Vickers method as 8,044±785 N/mm². All of these measurements indicate that the glass bodies obtained using the compositions and methods according to embodiments of the invention are solid silica glass bodies and possess the expected properties for such glass.

Example 5

In this example, the inventors investigated whether the compositions and methods of the invention could be used to adapt the viscosity of liquid glass compositions, while maintaining desired loadings of silica.

A series of liquid compositions were prepared comprising various amounts of silica from a solid source (OX50, colloidal silica from Aerosil®, hydrophilic fumed silica), and from various liquid sources according to the invention, in particular a preceramic polymer (Wacker Silres® H44, silicone resin, methyl-phenyl-silsesquioxane) and an Si alkoxide (tetraethyl orthosilicate, TEOS). All solutions also comprised HEMA and POE in ratios of 2.65 parts by weight HEMA per part by weight POE. A batch solution (A) was prepared with 50 wt % $SiO_2$ from OX50. Then, three solutions with 10 wt % $SiO_2$ from OX50 (B), 10 wt % $SiO_2$ from TEOS (C) and 10 wt % $SiO_2$ from H44 (D) were prepared and their viscosity was measured for comparison. Finally, solutions B to D were mixed with solution A in order to give new solutions with a total amount of $SiO_2$ of 40 wt %, solely from OX50 (E), from the sum of 30 wt % OX50 and 10 wt % $SiO_2$ from TEOS (F), or from the sum of 30 wt % $SiO_2$ from OX50 and 10 wt % $SiO_2$ from H44 (G). Solutions E to G have textures similar to solutions commonly used for soft and stereo-lithography.

The viscosities of the resulting compositions were then measured at room temperature (approx. 20° C.) using a DV-II Pro EXTRA (Brookfield Engineering) and different spindles (LV1 for solutions B to D and LV2 for solutions E to G). Measurements were taken at 50 rpm, 75 rpm and 100 rpm for all compositions except for composition G for which the torque exceeded limits at 75 and 100 rpm. Values reported relate to data taken at 50 rpm. Measurements lasted 120 s and data was collected every 10 s. As such, a total of 12 points were collected for each shear rate. The mean and standard deviation for these 12 points are provided in the table below. The compositions prepared and the resulting viscosities are shown in Table 5.

TABLE 5

Viscosities of various compositions comprising solid and liquid silica sources.

| Sample | OX50 % | $SiO_2$ loading from TEOS % | $SiO_2$ loading from H44 % | Viscosity (Pa * s) |
|---|---|---|---|---|
| A | 50 | 0 | 0 | NA |
| B | 10 | 0 | 0 | 24.75 ± 0.45 |
| C | 0 | 10 | 0 | 6.25 ± 0.62 |
| D | 0 | 0 | 10 | 26.67 ± 0.49 |
| E | 40 | 0 | 0 | 311.83 ± 0.94 |
| F | 30 | 10 | 0 | 103.00 ± 0.00 |
| G | 30 | 0 | 10 | 537.67 ± 1.15 |

Solution A was too viscous to be analysed with the equipment available. The data in Table 5 above indicates that the use of Si alkoxides according to the invention may advantageously reduce the viscosity of a polymerisable composition comprising solid silica while at the same time increasing the silica loading of the composition. The data indicates that the combination of H44 and OX50 results in an increase in viscosity. Without wishing to be bound by theory, the inventors believe that this may be due to the generation of some hydrogen bonding between Si—OH groups in the preceramic polymer and Si—OH groups on the surface of the OX50 particles. Nevertheless, the combination of solid and liquid silica enables to obtain compositions that have higher silica loadings than would be possible using solid silica particles only. Further, these values are still suitable for use in e.g. soft lithography or stereolithography process. Additionally, we note that solutions comprising polymers such as H44 may show a shear thinning behavior, whereby the viscosity of the solution decreases with increasing shear rates. As such, solutions comprising high loadings of silica from solid and polymeric liquid form may be advantageously mixed at high shear rates/energy.

Example 6

In this example, the inventors investigated whether the compositions and methods of the invention could be used to make complex shaped bodies by additive manufacturing.

In particular, compositions comprising: (i) 21.30 wt % TEOS, 17.00 wt % HEMA, 6.70 wt % POE, 25 wt % acrylate resin and 30 wt % OX50; (ii) 21.30 wt % TEOS, 13.00 wt % HEMA, 5.20 wt % POE, 30.50 wt % acrylate resin and 30 wt % OX50; or (iii) 21.30 wt % TEOS, 9.83 wt % HEMA, 3.87 wt % POE, 30.00 wt % acrylate resin and 35.00 wt % OX50; were prepared. The acrylate resin used in each of these compositions comprised a blend of acrylate monomers, glycol diacrylate monomers, and a phosphine oxide-based photoinitiator from Fun To Do (standard blend, as described in http://www.funtodo.net/media/msds-ftd-sb-uk.zip).

Figure 5A:
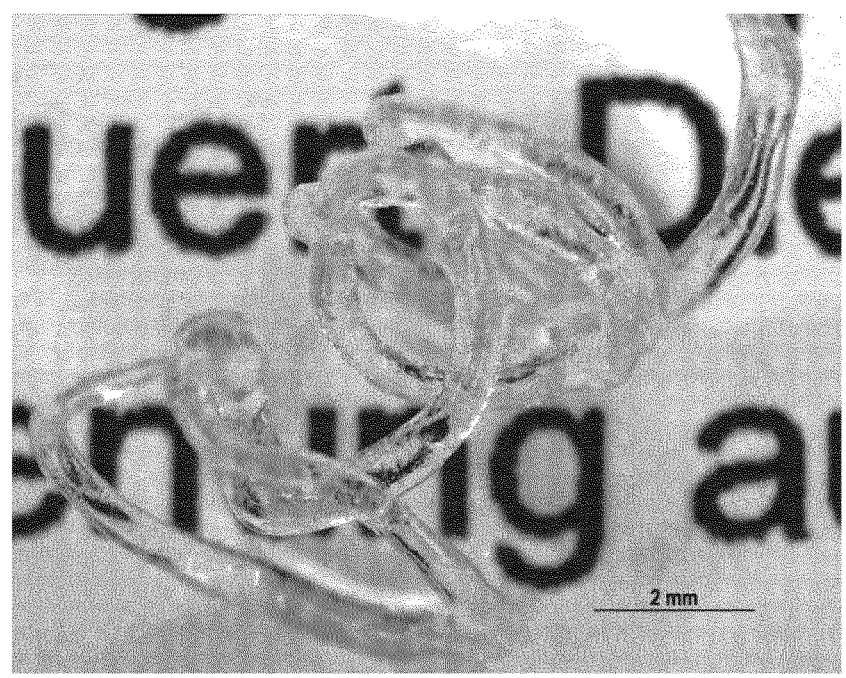
FIGS. 5A, 5B and 5C show sample glass bodies produced according to embodiments of the invention, each of which was prepared by combined free-forming (by extrusion through a nozzle) and curing.

FIG. 5A shows an example of a sample prepared by combined free-forming (by extruding the composition through a nozzle by hand) and photocuring. The object of FIG. 5A was produced using composition (iii) above.

Figure 5B:
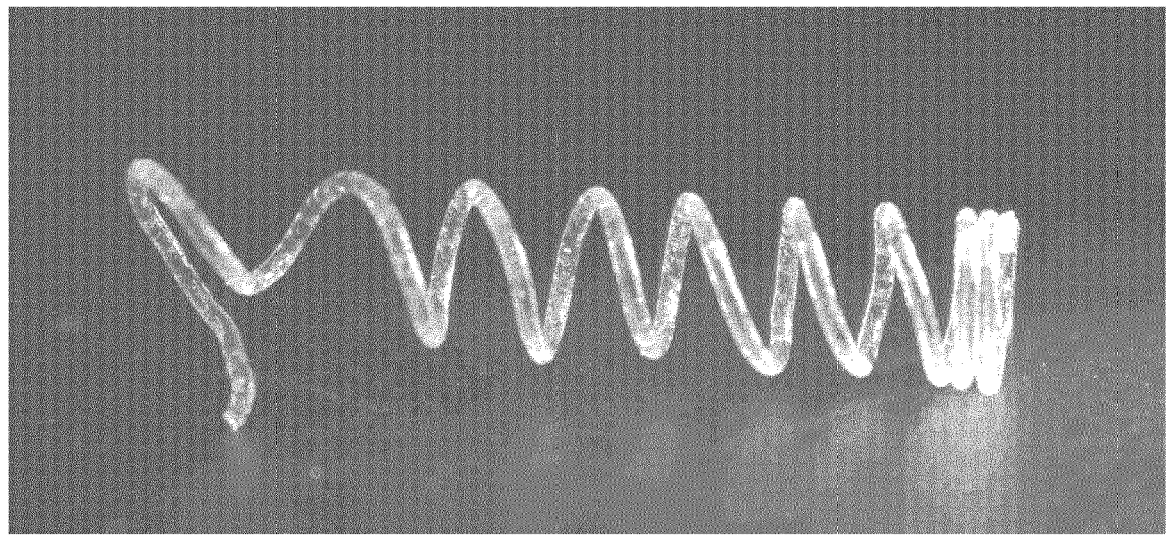
Figure 5C:
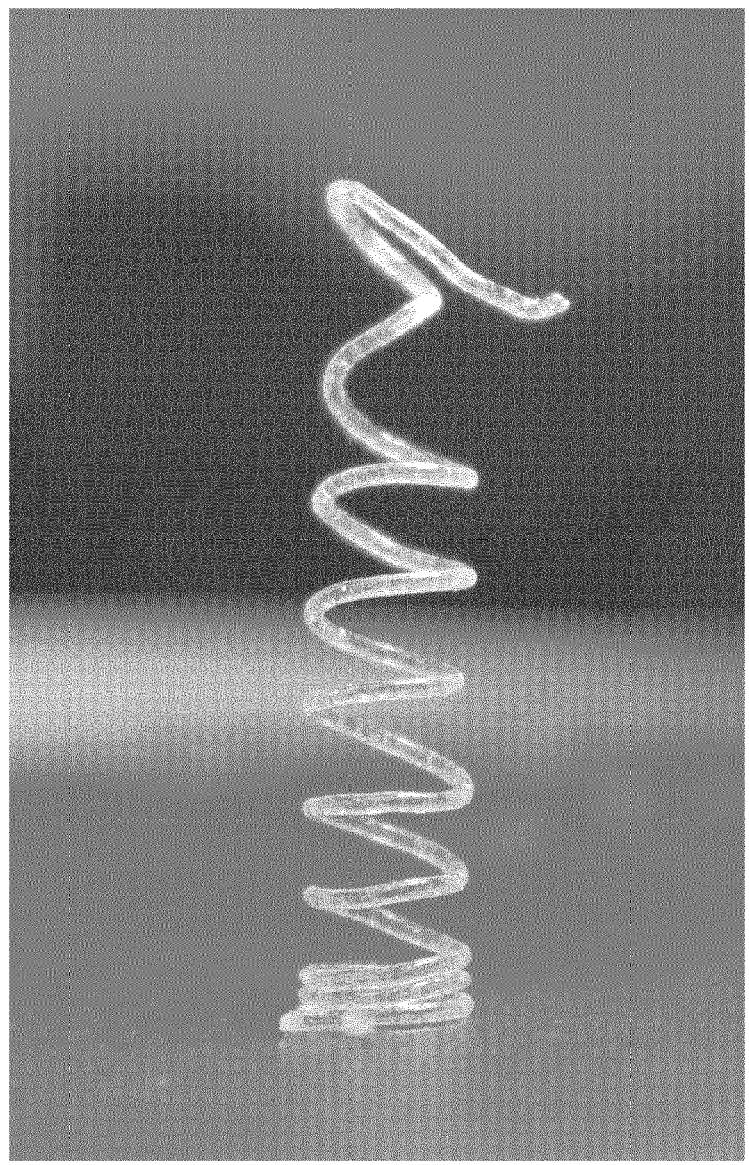

In addition, a fourth photocurable composition, (iv) 21.3% wt TEOS, 10.73% wt HEMA, 4.29% wt POE, 32.18% wt TEGDA, OX50 31.50% wt, and a photoinitiator (Irgacure 819 (CAS 162881-26-7) at 2% wt with respect to the amount of TEGDA) was made an extruded via a 3D printer (DELTA WASP 2040 Turbo, WASP, Italy) equipped with UV LEDs in order to cure the composition on extrusion. Exemplary printed objects are shown in FIGS. 5B and 5C, demonstrating the utility of the compositions and methods of the invention from high silica-loaded compositions to produce solid glass objects having relatively low shrinkage on sintering; and the flexibility of the compositions and methods in various additive manufacturing methods by controlling physicochemical properties such as viscosity and reactivity.

Figure 6A:
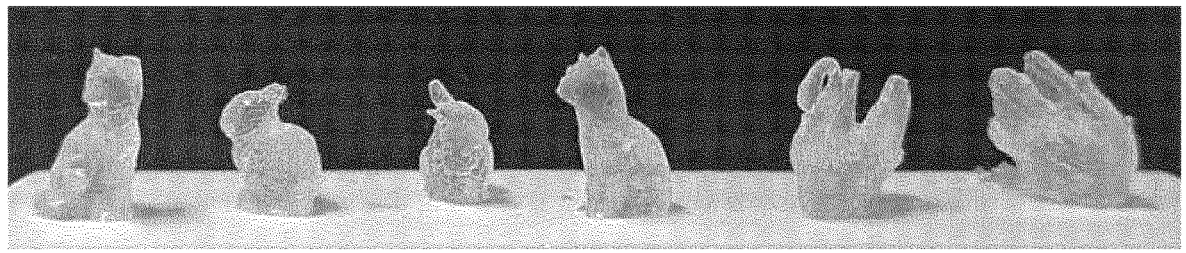
FIGS. 6A, 6B and 6C show decorative glass objects prepared by photolithography according to embodiments of the invention.
Figure 6B:
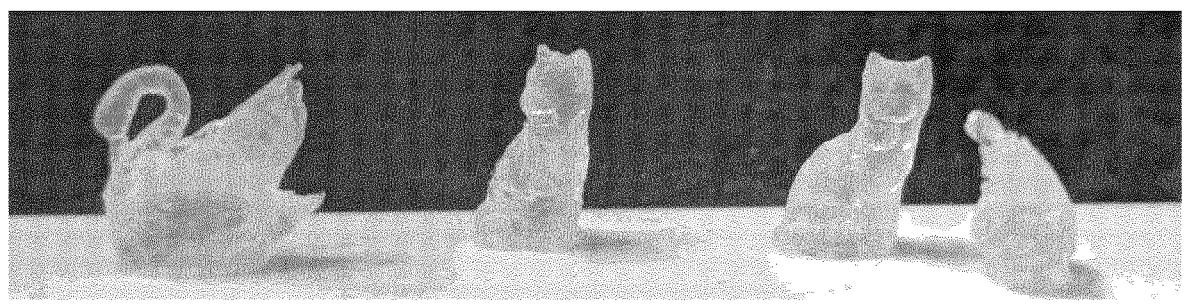
Figure 6C:
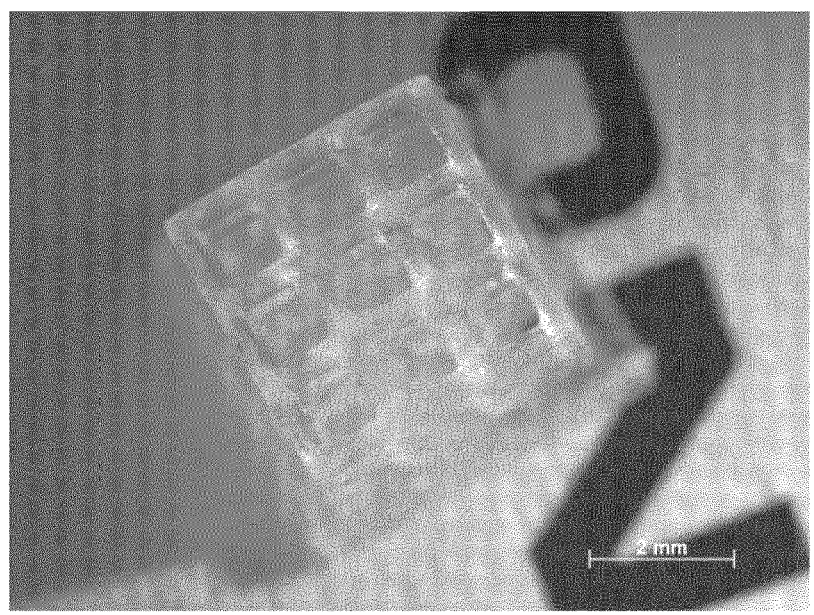

FIG. 6 shows an image of samples prepared by photolithography using compositions (i)—FIG. 6B, and (ii)—FIG. 6A above. Briefly, a printer (3DLPrinter-HD 2.0, by Robot Factory) was used according to manufacturer's instructions, with an exposure time between 2 and 15 seconds and layers about 0.08 mm thick. The samples shown on FIG. 6 have not been polished. As can be seen on this photograph, the compositions and methods of the invention enable to produce solid glass bodies with complex shapes, wherein the solid glass bodies are transparent at least upon polishing.

A further composition according to the invention using a silica alkoxide as a liquid source of silica was prepared, comprising the following ingredients by weight %: 9.0% polysiloxane acrylate (PSA) commercially available as TEGO RC711 from Evonik®; 22.64% OX50 (colloidal silica from Aerosil®, hydrophilic fumed silica, https://products-re.evonik.com/www2/uploads/productfinder/AEROSIL-OX-50-EN.pdf); 15.36 wt % POE; 4.00 wt % PEGDA 700; and 49.0% tetraethyl orthosilicate (TEOS, silica alkoxide, providing about 22.0% $SiO_2$ by weight of the total composition). This sample was 3D printed using a 3DLPrinter-HD 2.0, by Robot Factory, demonstrating that the compositions of the invention are suitable for additive manufacturing. This sample is shown on FIG. 6C.

Example 7

In this example, the inventors investigated whether the compositions and methods of the invention could be used to generate transparent glass bodies. Two compositions were tested which included the following ingredients: (i) 21.30 wt % TEOS, 32.20 wt % HEMA, 12.02 wt % POE, 5.00 wt % PEGDA 700 and 29.48 wt % OX50; and (ii) 37.63 wt % benzyl alcohol, 25.90 wt % TEGO RC711, 36.48 wt % OX50.

The compositions were cured by soft lithography and photopolymerised in a UV oven for 2 to 15 minutes, then debinded by applying a ramp of 0.1° C./min from room temperature to 700° C. followed by 3 hours at 700° C.; and sintered by applying a ramp of 15° C./min up to 1,400° C. followed by 10 minutes at 1,400° C. The samples have dimensions of between about 10×7×7 mm and about 10×7×4 mm.

Figure 4:
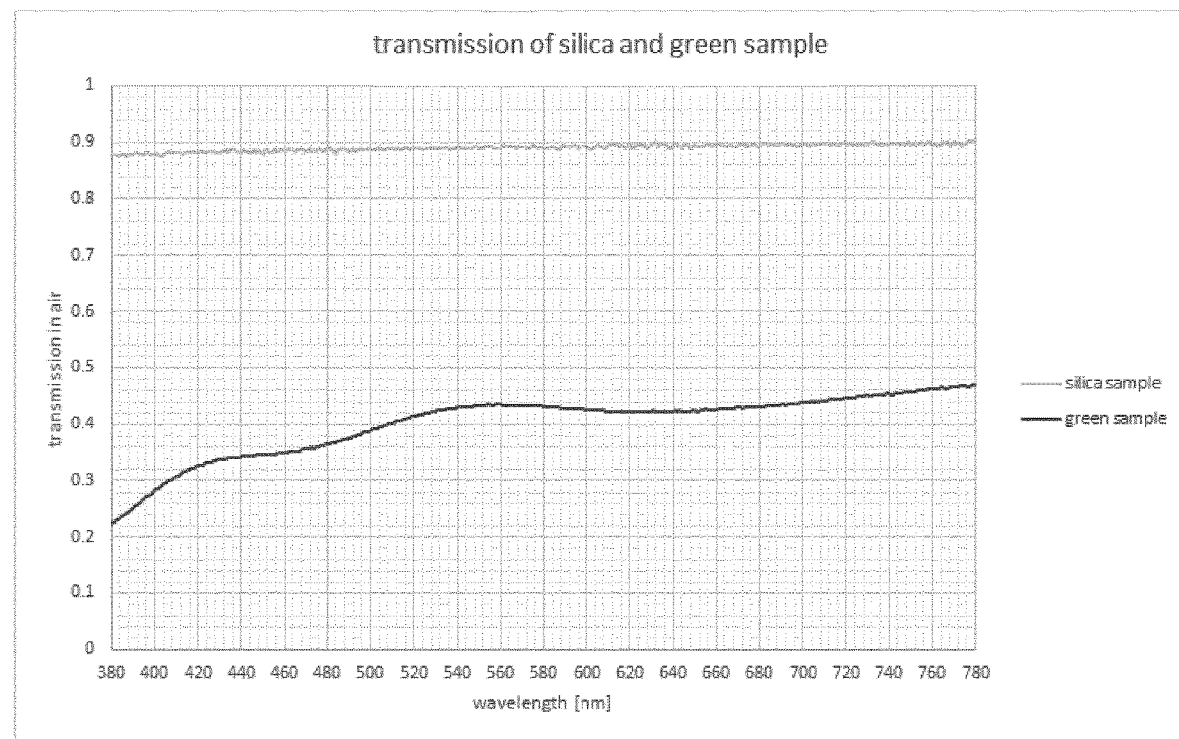
FIG. 4 shows the transparency for two sample glass bodies according to embodiments of the invention.
Figure 7A:
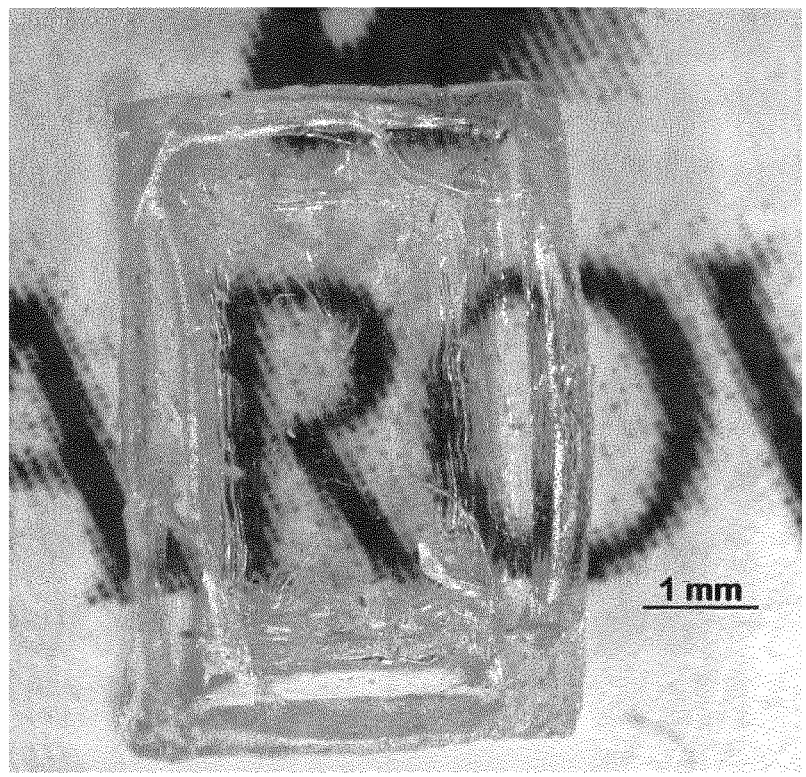
FIGS. 7A and 7B show sample glass bodies according to embodiments of the invention.
Figure 7B:
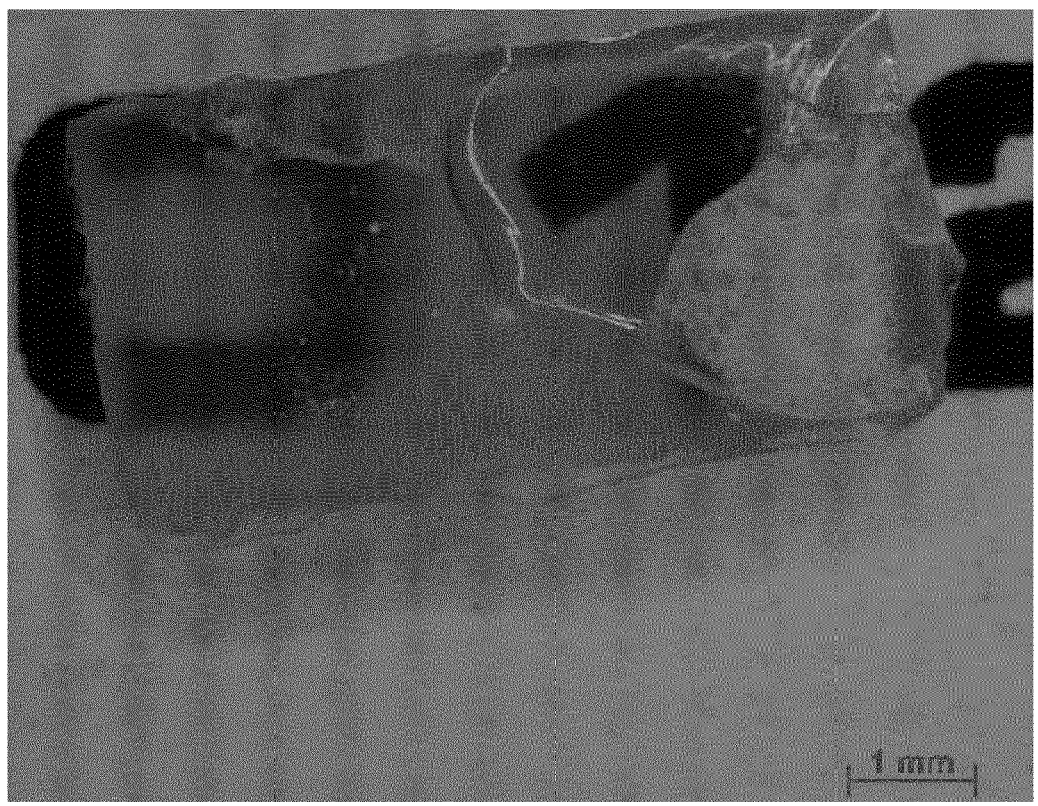

Photos of the samples are provided as FIGS. 7A—obtained using composition (i), and 7B—obtained using composition (ii). The transparency of the samples was measured using a UV/VIS/NIR spectrometer Perkin Elmer Lambda 900. The results of this analysis can be seen on FIG. 4, which shows the data for the sample shown on FIG. 7A ('silica sample') and the sample shown on FIG. 7B ('green sample'). As can be seen in FIG. 4, the sample of FIG. 7A ('silica sample') had excellent transparency between 380 and 780 nm, with transmission in air of close to 90%. The sample shown on FIG. 7B ('green sample') contained a chromophore (chromium) and exhibited a green colouration. As such, its transparency in the visible range is lower, although as can be seen on FIG. 7B, the sample is still transparent in the sense that visible light is not highly scattered by the material (although some of it is absorbed).

Example 8

In this example, the inventors investigated whether the results shown in Example 1 could be replicated to improve over prior art compositions including the highest amount of solid silica that has been reported to be included in polymerisable solutions for making glass bodies. The inventors at the same time investigated whether other preceramic polymers could be used, including photocurable silicon-based polymers/monomers.

A composition according to the prior art was prepared comprising the following ingredients by weight %: 28.6% (hydroxyethyl)methacrylate (HEMA, organic monomer); 3.1% poly(ethylene glycol) diacrylate (PEGDA, crosslinking monomer); 57.5% OX50 (colloidal silica from Aerosil®, hydrophilic fumed silica, https://products-re.evonik.com/www2/uploads/productfinder/AEROSIL-OX-50-EN.pdf); and 10.8% phenoxyethanol (POE, solvent). As mentioned above, it is believed that such high loadings of solid silica are closest to the highest amounts that can be obtained in a stable, polymerisable solution. This results in highly viscous samples that are very difficult to manipulate, and in particular that are not amenable to additive manufacturing using currently available technologies.

This sample was cast, polymerised, subjected to thermal debinding, and sintered according to the following schedule: ramp 15° C./min from RT, plateau 1,400° C., 10 min (bottom-loading furnace). The weight loss (difference between the weight of the green part and the weight of the glass body) was quantified as 43.6±0.1%, and the linear and volumetric shrinkages (shrinkage between the green part and the glass body) were quantified as 24.8±0.1% and 57.5±0.8%, respectively.

A composition according to embodiments of the invention using a liquid preceramic polymer as a liquid source of silica was prepared, comprising the following ingredients by weight %: 22.33% (hydroxyethyl)methacrylate (HEMA, organic monomer); 57.20% OX50 (colloidal silica from Aerosil®, hydrophilic fumed silica, https://products-re.evonik.com/www2/uploads/productfinder/AEROSIL-OX-50-EN.pdf); 8.47% phenoxyethanol (POE, solvent); and 12.00% ABCR AB108972 (photocurable siloxane polymer, 3-bis(3-methacryloxypropyl)tetrakis(trimethylsiloxy)disiloxane, providing about 2.77 wt % $SiO_2$ by weight of the total composition).

Two samples were cast, polymerised, subjected to thermal debinding, and sintered according to the following schedule: ramp 15° C./min from RT, plateau 1,400° C., 10 min (bottom-loading furnace). The weight loss (difference between the weight of the green part and the weight of the glass body) was quantified as 39.6±0.0%, and the linear and volumetric shrinkages (shrinkage between the green part and the glass body) were quantified as 24.4±0.7% and 56.8±1.2%, respectively.

A composition according to embodiments of the invention using a liquid preceramic polymer as a liquid source of silica was prepared, comprising the following ingredients by weight %: 22.33% (hydroxyethyl)methacrylate (HEMA, organic monomer); 57.20% OX50 (colloidal silica from Aerosil®, hydrophilic fumed silica, https://products-re.evonik.com/www2/uploads/productfinder/AEROSIL-OX-50-EN.pdf); 8.47% phenoxyethanol (POE, solvent); and 12.00% TMSPM (3-(trimethoxysilyl)propyl methacrylate)—a low molecular weight silane, also known as 3-(methacryloyloxy)propyl] trimethoxysilane, providing about 5.40% $SiO_2$ by weight of the total composition).

Two samples were cast, polymerised, subjected to thermal debinding, and sintered according to the following schedule: ramp 15° C./min from RT, plateau 1,400° C., 10 min (bottom-loading furnace). The weight loss (difference between the weight of the green part and the weight of the glass body) was quantified as 43.2%, and the linear and volumetric shrinkages (shrinkage between the green part and the glass body) were quantified as 24.6±0.8% and 57.2%, respectively.

This data indicates that the effects seen in Example 1 can be replicated with different liquid sources of silica, and can also be used to improve on formulations that have some of the highest known loadings of silica from solid sources.

Example 9

In this example, the inventors investigated whether the results and improvements demonstrated in the production of solid glass bodies from polymerisable compositions comprising both a solid and a liquid source of silica could be reproduced starting from a primarily liquid-based silica composition.

The following two polymerisable glass compositions were manufactured according to the compositions and methodologies given below: SGM ('sol-gel monocomponent') and WB ('water-based').

SGM:

TABLE 6

| SGM composition | |
|---|---|
| Reagents | wt. % |
| Tetraethyl orthosilicate | 37.2 |
| Methyl trimethoxy silane | 3.6 |
| Absolute ethanol | 31.5 |
| Nitric acid 1M | 4.9 |
| Aerosil OX 50 | 2.0 |
| Tetra(ethylene glycol) diacrylate | 6.4 |
| Acetic acid 1M | 14.5 |

For the preparation of example composition SGM, tetraethyl orthosilicate, methyl trimethoxy silane, absolute ethanol and nitric acid 1M are stirred together for 30 minutes (although in other examples stirring may be performed for between 5 and 60 minutes). Colloidal silica powder (Aerosil OX 50) was then added in 4 steps, stirring the resulting mixture after each silica powder addition for 10 minutes (although in other examples colloidal silica may be added in any number of steps from e.g. 1 to 10, and stirring after each addition may be performed for between 1 and 15 minutes). Ultrasound mixing was used to improve mixing and homogeneity of the liquid suspension. The photocurable acrylate was then added and stirred for 15 minutes (although in other examples stirring may be performed for e.g. between 5 and 60 minutes)

Bis(2,4,6-trimethylbenzoyl)-phenylphosphine oxide was used as photoinitiator at a typical concentration of 2 wt % relative to the weight of the photocurable compound (tetra (ethylene glycol) diacrylate). In other examples, the photoinitiator may alternatively be 1-hydroxycyclohexyl-phenyl-ketone. Such photoinitiators may be used at other desirable concentrations, e.g. in an amount of about 0.5 to 4% by weight of the photocurable acrylate. A photoabsorber may in some embodiments be added at a concentration of between 0.05 and 0.5% by weight (e.g. 0.3 wt %) of the photocurable acrylate was added to increase resolution during printing. Such a photoabsorber may not be necessary in some applications, such as casting.

Acetic acid 1M was then added and the resulting mixture was stirred for 5 minutes (although in other examples stirring times of between 1 and 30 minutes may be used).

Thus, composition SGM contains two different sources of liquid silica as well as a solid source of silica in lesser amount. In this case, the heat treatment regime was improved through the use of a 'drying' cycle before debinding. Thus, the sample was cast, polymerised, subjected to drying, thermal debinding, and sintered according to either of the following two schedules:

| Slow drying: | | Fast drying | |
|---|---|---|---|
| T [° C.] | Dwelling [h] | T [° C.] | Dwelling [h] |
| 85 | 5 | 50 | 15 |
| 95 | 7 | 80 | 5 |
| 105 | 12 | 100 | 4 |
| 115 | 24 | 120 | 15 |
| 120 | 48 | | |

Followed by sintering (same for both schedules):

| T start [° C.] | T end [° C.] | Ramp [° C./min] | Dwelling [min] |
|---|---|---|---|
| 20 | 450 | 0.1 | 60 |
| 450 | 550 | 0.2 | 30 |
| 550 | 800 | 0.5 | 30 |
| 800 | 1030 | 0.8 | 60 |

Desirably, the SGM composition resulted in a transparent solid glass body, demonstrating the utility of the compositions and methods of the invention when based on predominantly liquid sources of silica.

WB:

TABLE 7

| WB composition | |
|---|---|
| Reagents | wt. % |
| Water | 23.4 |
| Polyethylene glycol diacrylate, Mn 575 | 15.1 |
| Tetraethyl orthosilicate | 31.7 |
| Nitric acid 1M | 4.8 |
| Aerosil OX 50 | 25.0 |

For the preparation of example composition WB, tetraethyl orthosilicate was mixed with nitric acid 1M and stirred for 20 minutes; although in other examples stirring time may be selected at between 5 and 120 minutes. Separately, water was mixed with poly(ethylene glycol) diacrylate (Mn 575) and stirred for 10 minutes (although in other examples a stirring time of between 5 and 30 minutes may be selected). The two solutions are then mixed together and stirred for 20 minutes to create a homogeneous mixture. Depending on the specific types and/or volumes of the materials being combined, in other examples mixing times between 5 and 60 mins, or between 10 and 30 mins may alternatively be selected.

Colloidal silica powder (Aerosil OX 50) was then added in 10 steps (although in other examples any number of separate additions between 1 and about 50 may be selected to ensure the desired homogeneous mixing of solid and liquid components), mixing the resulting solution after each silica powder addition for 5 minutes at a rotational speed of 2,000 rpm with a planetary centrifugal mixer to give a homogeneous suspension. Alternatively, mixing could also be performed using a mechanical stirrer or with ultrasound, provided in each case a homogeneous mixture is achieved before the next solid silica addition. Indeed, the inventors have found that complete mixing is highly advantageous in achieving the desired transparent, fracture-free solid glass bodies. In other examples and embodiments, therefore, mixing after each silica addition may be selected from between 1 and 15 minutes at a rotational speed between about 200 and about 2,000 rpm, depending on the composition and ease of mixing.

As above, bis(2,4,6-trimethylbenzoyl)-phenylphosphine oxide was used as photoinitiator at a typical concentration of 2 wt % relative to the weight of the photocurable compound (polyethylene glycol diacrylate). In other examples, the photoinitiator may alternatively be 1-hydroxycyclohexyl-phenyl-ketone. Such photoinitiators may be used in an amount of from 0.5 to 4% by weight of the photocurable acrylate. A photoabsorber may—as required by the particular printing system—be added at a concentration of between 0.05 and 0.5% by weight of the photocurable acrylate (e.g. to increase the resolution during the printing). For example, the photoabsorber may be used at a concentration of about 0.3% by weight of the photocurable acrylate.

Before printing, the mixture is beneficially degassed using a planetary centrifugal mixer at a revolution speed of 2,000 rpm (or at any convenient speed between e.g. 200 and 2,000 rpm) or by use of a vacuum pump.

Composition WB is a water-based composition, which makes it particularly desirable from an environmental and sustainability perspective. This composition also uses fewer chemical and so may also offer beneficial cost implications.

In this case, the heat treatment regime involved a debinding and a sintering step as follows:

Debinding:

| T start [° C.] | T end [° C.] | Ramp [° C./min] | Dwelling [h] |
|---|---|---|---|
| 20 | 700 | 0.1 | 3 |

Sintering:

| T start [° C.] | T end [° C.] | Ramp [° C./min] | Dwelling [min] |
|---|---|---|---|
| 20 | 1,400 | 15 | 10 |

As noted above, desirably, the WB composition involves a more desirable composition for use in sustainable/environmentally more friendly applications and demonstrates the utility of such water-based compositions and methods for the production of solid, transparent glass bodies derived from polymerizable compositions comprising both liquid and solid forms of silica—in this particular example approx. equal proportions of solid and liquid silica precursors were used.

Figure 9A:
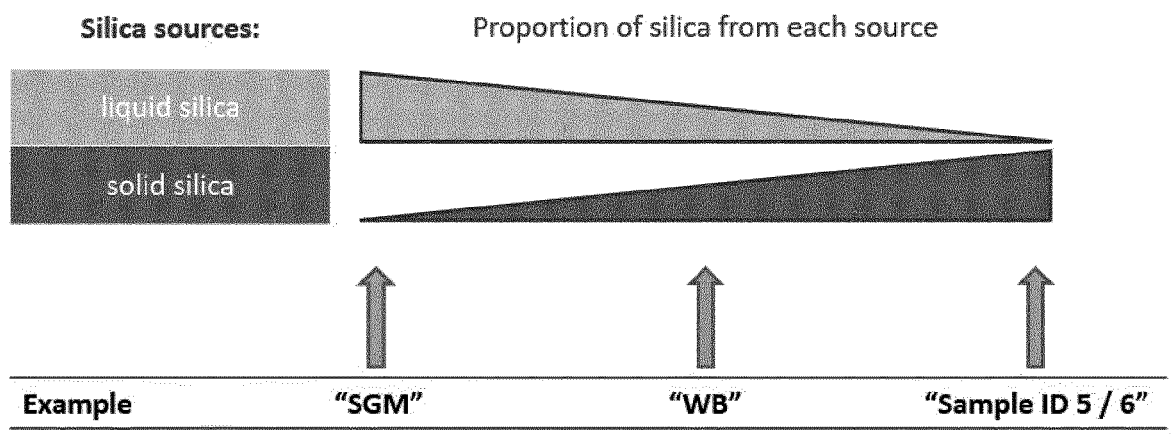
FIG. 9 illustrates general schemes for forming silica-based compositions useful in the methods according to the invention: (A) illustrating how the proportion of solid and liquid source of silica may be varied while maintaining a desirably high overall silica loading in a pre-sintered monocomponent glass composition. The arrows indicate the relative positions in the scheme corresponding to Examples SGM, WB and Sample ID 5/6 according to the invention; and (B) illustrating how the proportion of solid and liquid source of silica may be varied in the presence of a desired proportion of one or more additional metal/metalloid oxide precursor while maintaining a desirably high overall silica loading in a pre-sintered multicomponent glass composition. The arrows indicate the relative positions in the scheme corresponding to Examples SGB, ZrBu, AlBu and ZrBu1 according to the invention.

With reference to FIG. 9A, this Example demonstrates the benefits of the invention, i.e. in forming solid, transparent, glass bodies from polymerisable compositions based on mixtures of both liquid and solid sources of silica. As depicted in FIG. 9A, beneficial compositions of the invention may have a relatively high solid silica loading in conjunction with a relatively low liquid silica loading (e.g. sample ID Nos. 5 and 6); may have a relatively low solid silica loading in conjunction with a relatively high liquid silica loading (e.g. sample SGM); or may have an approximately equal loading of solid silica in conjunction with liquid silica loading (e.g. sample WB).

Example 10

In this example, the inventors investigated whether the results and improvements demonstrated in the production of monocomponent solid glass bodies from polymerisable compositions comprising both a solid and a liquid source of silica could be reproduced in the production of multicomponent solid glass bodies from polymerisable compositions comprising both a solid and a liquid source of silica.

The following four polymerisable multicomponent glass compositions were manufactured according to the compositions and methodologies given below: SGB ('sol-gel bicomponent'); AlBu (containing a secondary metal/metalloid oxide precursor, aluminium-tri-sec-butoxide); ZrBu (containing a secondary metal/metalloid oxide precursor, zirconium butoxide); and ZrBu1 (also containing zirconium butoxide).

SGB:

TABLE 8

| SGB composition | |
|---|---|
| Reagents | wt. % |
| Tetraethyl orthosilicate | 28.5 |
| Methyl trimethoxy silane | 2.8 |
| Absolute ethanol | 32.2 |
| Nitric acid 1M | 3.8 |
| Zirconium butoxide | 14.7 |
| Aerosil OX 50 | 2.0 |
| Tetra(ethylene glycol) diacrylate | 4.9 |
| Acetic acid 1M | 11.1 |

For the preparation of example composition SGB, tetraethyl orthosilicate, methyl trimethoxy silane, absolute ethanol and nitric acid (1 M) are stirred together for 30 minutes (or alternatively for any suitable period between about 5 and 60 minutes). In this example, zirconium butoxide is then added and stirred for 20 minutes (but in other examples a stirring time of between 5 and 30 minutes may be used. Colloidal silica powder (Aerosil OX 50) was then added in 1 to 10 steps—in this example 4 steps were used, stirring the resulting mixture after each silica powder addition for 10 minutes (or in other examples, between 1 and 15 minutes as may be suitable). Ultrasound mixing may also be used to improve mixing and homogeneity of the liquid suspension. The photocurable acrylate was then added and stirred for 15 minutes—in other examples, a suitable stirring time between about 5 and about 30 minutes may be selected.

In this example, bis(2,4,6-trimethylbenzoyl)-phenylphosphine oxide was used as a photoinitiator at a typical concentration of 2 wt % relative to the weight of the photocurable compound (tetra(ethylene glycol) diacrylate). In other examples, the photoinitiator may alternatively be 1-hydroxycyclohexyl-phenyl-ketone. Such photoinitiators may be used in an amount of from 0.5 to 4% by weight of the photocurable acrylate. A photoabsorber at a concentration of between 0.05 and 0.5% (typically at about 0.3%) by weight of the photocurable acrylate may in some embodiments be added to increase resolution during printing. Such a photoabsorber may not be necessary in some applications, such as casting.

Acetic acid 1M was then added and the resulting mixture was stirred for 5 minutes (although times of between 1 and 30 mins may alternatively be used).

Like sample SGM in Example 9, sample SGB contains two different sources of liquid silica as well as a solid source of silica in lesser amount and a secondary inorganic oxide precursor in the form of zirconium butoxide, so as to produce zirconium oxide in the final solid glass body.

Again, as in the case of SGM (Example 9), the heat treatment regime was improved through the use of a 'drying' cycle before debinding. As above, either a slow or a fast drying schedule may be employed with similar results. The sample was cast, polymerised, subjected to drying, thermal debinding, and sintered according to either of the following two schedules:

| Slow drying: | | Fast drying | |
| --- | --- | --- | --- |
| T [° C.] | Dwelling [h] | T [° C.] | Dwelling [h] |
| 85 | 5 | 50 | 15 |
| 95 | 7 | 80 | 5 |
| 105 | 12 | 100 | 4 |
| 115 | 24 | 120 | 15 |
| 120 | 48 | | |

Sintering (same for both schedules):

| T start [° C.] | T end [° C.] | Ramp [° C./min] | Dwelling [min] |
| --- | --- | --- | --- |
| 20 | 450 | 0.1 | 60 |
| 450 | 550 | 0.2 | 30 |
| 550 | 800 | 0.5 | 30 |
| 800 | 1030 | 0.8 | 60 |

Desirably, the SGB glass body is expected to exhibit a desirably increased refractive index in comparison to the SGM glass body lacking zirconia.

AlBu:

TABLE 9

| AlBu composition | |
| --- | --- |
| Reagents | wt. % |
| Tetraethyl orthosilicate | 18.6 |
| Hydroxyethyl methacrylate | 18.0 |
| Phenoxyethanol | 7.1 |
| Aluminum-tri-sec-butoxide | 9.7 |
| Ethyl acetoacetate | 3.0 |
| Tetra(ethylene glycol) diacrylate | 21.8 |
| Aerosil OX 50 | 21.8 |

For the preparation of example composition AlBu, aluminum-tri-sec-butoxide was first mixed with ethyl acetoacetate and stirred for 10 minutes (although in other examples stirring times may be chosen between 1 and 15 minutes). Tetraethyl orthosilicate (TEOS), hydroxyethyl methacrylate, phenoxyethanol and the photocurable acrylate were separately mixed together and stirred for 5 minutes to provide a well-mixed composition. In other examples mixing may be for a suitable time period of between 1 and 10 minutes. The mixture of aluminum-tri-sec-butoxide and ethyl acetoacetate was then added to the composition including TEOS, and the two liquids were stirred to create a homogeneous liquid for 5 minutes—again, in other examples, mixing times of e.g. between 1 and 10 minutes may be used as necessary to achieve a homogeneous mixture.

Colloidal silica powder (Aerosil OX 50) was then added in 20 steps (although the number of steps may in other examples/embodiments be between 1 and 50 steps), mixing the resulting solution well after each silica powder addition for 5 minutes at a speed of 2,000 rpm with a planetary centrifugal mixer, as necessary, in order to create a homogeneous suspension. In other embodiments, mixing can also be performed with a mechanical stirrer or using ultrasound. It has been found that by increasing the number of separate solid silica additions (in this case up to 50), and thus, introducing smaller quantities of solid silica at end step, a more homogenous suspension/solution may be achieved, with consequential beneficial results then seen in the eventual solid glass body. In any such embodiments, mixing after each addition may be for between e.g. 1 and 15 minutes and a rotation speed between about 200 and 2,000 rpm may be used as necessary.

As in the compositions described in Examples 9 and 10 above bis(2,4,6-trimethylbenzoyl)-phenylphosphine oxide was used as photoinitiator at a typical concentration of 2 wt % relative to the weight of the photocurable compound (tetra(ethylene glycol) diacrylate). In other examples, the photoinitiator may alternatively be 1-hydroxycyclohexyl-phenyl-ketone. Such photoinitiators may be used in an amount of from 0.5 to 4% by weight of the photocurable acrylate. A photoabsorber at a concentration of between 0.05 and 0.5% (typically about 0.3%) by weight of the photocurable acrylate was added to increase resolution during printing. Such a photoabsorber may not be necessary in some applications, such as casting.

Before use, the mixture can be degassed using a planetary centrifugal mixer at 2,000 rpm (or at any suitable speed between 200 and 2,000 ppm) or a vacuum pump.

Sample AlBu contains two different forms of silica (solid and liquid) in approx. equal proportions as well as a secondary inorganic oxide precursor in the form of aluminium butoxide, so as to produce aluminium oxide in the final solid glass body.

After adequate mixing, the AlBu sample was cast, polymerised, subjected to drying, thermal debinding, and sintered according to the following schedule:

Debinding:

| T start [° C.] | T end [° C.] | Ramp [° C./min] | Dwelling [h] |
| --- | --- | --- | --- |
| 20 | 700 | 0.1 | 3 |

Sintering (same for both schedules):

| T start [° C.] | T end [° C.] | Ramp [° C./min] | Dwelling [h] |
|---|---|---|---|
| 20 | 1,500 | 15 | 10 |

Desirably, the AlBu glass body is expected to have an increased refractive index over a similar comparison lacking aluminium oxide.

ZrBu:

TABLE 10

ZrBu composition

| Reagents | wt. % |
|---|---|
| Tetraethyl orthosilicate | 19.0 |
| Hydroxyethyl methacrylate | 18.4 |
| Phenoxyethanol | 7.3 |
| Zirconium butoxide | 9.9 |
| Ethyl acetoacetate | 0.8 |
| Tetra(ethylene glycol) diacrylate | 22.3 |
| Aerosil OX 50 | 22.3 |

For the preparation of example composition ZrBu, zirconium butoxide was first mixed with ethyl acetoacetate and stirred for 10 minutes (although mixing times between 1 and 15 minutes may, for example, be selected). Tetraethyl orthosilicate (TEOS), hydroxyethyl methacrylate, phenoxyethanol and the photocurable acrylate were separately mixed together and stirred for 5 minutes to provide a well-mixed composition. Longer or shorter mixing times of between 1 and 10 minutes may alternatively be used, providing a well-mixed composition is achieved. The mixture of zirconium butoxide and ethyl acetoacetate was then added to the composition including TEOS, and the two liquids were stirred to create a homogeneous liquid for 5 minutes. In other examples and embodiments, however, a suitable mixing time of between 1 and 10 minutes may be selected.

Colloidal silica powder (Aerosil OX 50) was next added in 20 steps, mixing the resulting solution well after each silica powder addition for 5 minutes at a speed of 2,000 RPM with a planetary centrifugal mixer, in order to create a homogeneous suspension. It will be appreciated, however, that if a homogeneous mixture is not achieved under the selected conditions alternative numbers of additions (e.g. between 1 and 50 additions); alternative mixing times (e.g. between about 1 and 10 minutes); and alternative mixing speeds (e.g. between about 200 and 2,000 rpm) may be used, as necessary and/or convenient. Indeed, it has been found that by increasing the number of separate solid silica additions (in this case up to 50), and thus, introducing smaller quantities of solid silica at end step, a more homogenous suspension/solution may be achieved, with consequential beneficial results then seen in the eventual solid glass body. In other embodiments, mixing can also be performed with a mechanical stirrer or using ultrasound.

As for composition AlBu above, bis(2,4,6-trimethylbenzoyl)-phenylphosphine oxide was used as photoinitiator at a concentration of 2 wt % relative to the weight of the photocurable compound (tetra(ethylene glycol) diacrylate). In other examples, the photoinitiator may alternatively be 1-hydroxycyclohexyl-phenyl-ketone. Such photoinitiators may be used in an amount of from 0.5 to 4% by weight of the photocurable acrylate. In embodiments, a photoabsorber at a concentration of between 0.05 and 0.5% (typically about 0.3%) by weight of the photocurable acrylate was added to increase resolution during printing. Such a photoabsorber may not be necessary in some applications, such as casting.

Before use, the mixture can be degassed using a planetary centrifugal mixer at any suitable speed between e.g. 200 and 2,000 rpm. In this example, degassing was performed at a revolution speed of 2,000 rpm. As noted above, a vacuum pump may alternatively be used.

Sample ZrBu contains two different forms of silica (solid and liquid) in approx. equal proportions as well as a secondary inorganic oxide precursor in the form of zirconium butoxide, so as to produce zirconium oxide in the final solid glass body.

After adequate mixing, the ZrBu sample was cast, polymerised, subjected to drying, thermal debinding, and sintered according to the following schedule:

Debinding:

| T start [° C.] | T end [° C.] | Ramp [° C./min] | Dwelling [h] |
|---|---|---|---|
| 20 | 700 | 0.1 | 3 |

Sintering (same for both schedules):

| T start [° C.] | T end [° C.] | Ramp [° C./min] | Dwelling [h] |
|---|---|---|---|
| 20 | 1,500 | 15 | 10 |

Desirably, the ZrBu glass body is expected to have an increased refractive index over a similar comparison lacking zirconium oxide.

ZrBu1:

TABLE 11

ZrBu1 composition

| Reagents | wt. % |
|---|---|
| Tetraethyl orthosilicate | 2.3 |
| Hydroxyethyl methacrylate | 31.5 |
| Phenoxyethanol | 11.4 |
| Zirconium butoxide | 4.7 |
| Ethyl acetoacetate | 0.4 |
| Tetra(ethylene glycol) diacrylate | 3.4 |
| Aerosil OX 50 | 46.3 |

Despite the different quantities, sample ZrBu1 includes the same components as sample ZrBu above, and was produced using essentially the same methodology as that described for ZrBu above.

Figure 8:
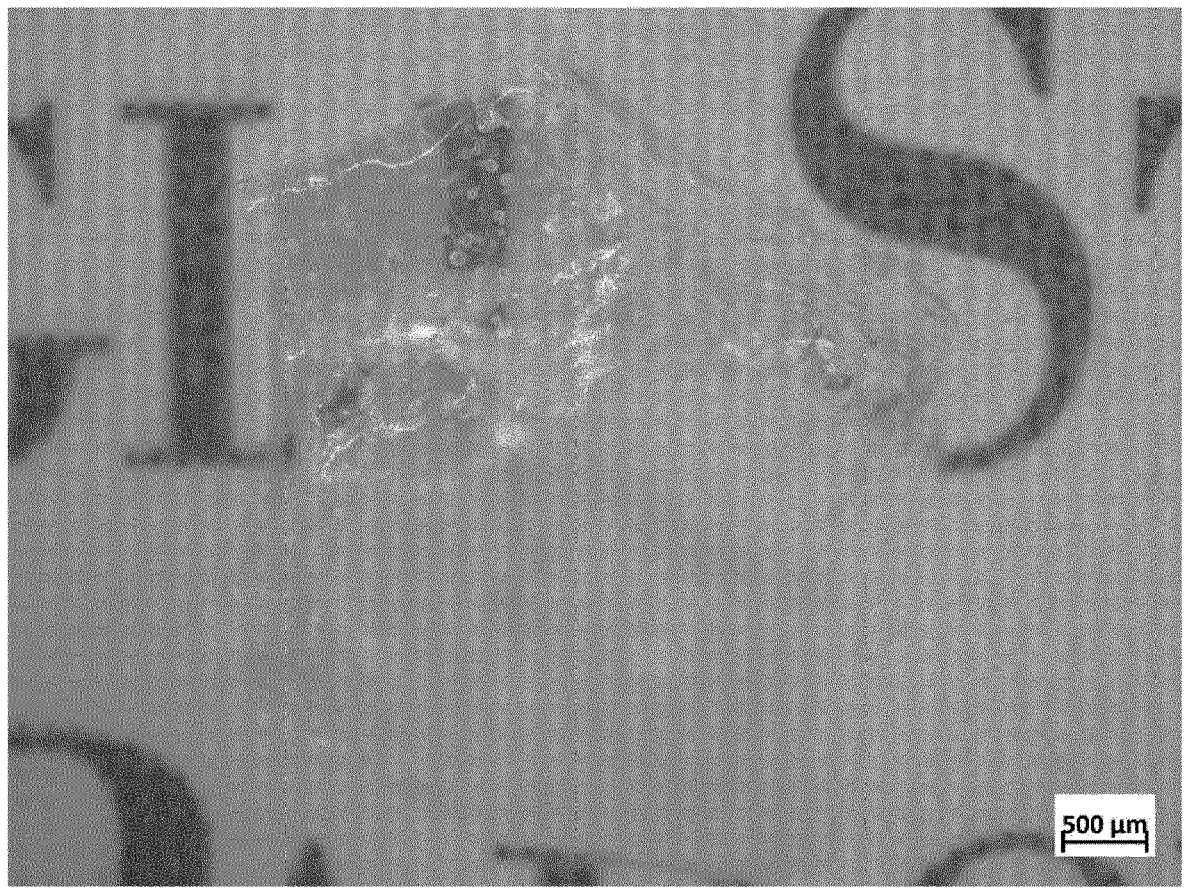
FIG. 8 shows a sample multicomponent glass body according to embodiments of the invention comprising silica and zirconia.

FIG. 8 shows a solid glass body of ZrBu1, demonstrating that transparent, solid multicomponent glass bodies can be produced having a desirably high refractive index.

Figure 9B:
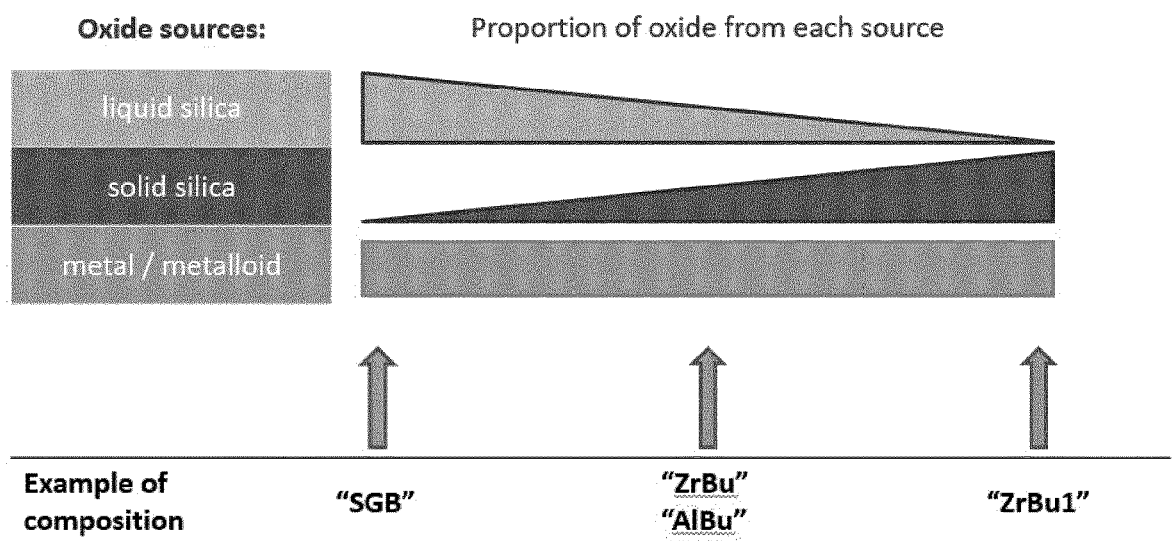

With reference to FIG. 9B, Example 10 demonstrates the benefits of the invention, i.e. in forming solid, transparent, glass bodies from polymerisable compositions based on mixtures of both liquid and solid sources of silica in a wide range of relative proportions. As depicted in the figure, beneficial compositions of the invention may have a relatively high solid silica loading in conjunction with a relatively low liquid silica loading (e.g. sample ZrBu1); may have a relatively low solid silica loading in conjunction with a relatively high liquid silica loading (e.g. sample SGB); or may have a more equal loading of solid silica and liquid silica (e.g. samples ZrBu and AlBu), in conjunction with a desired proportion of a secondary metal or metalloid oxide. In this way the glass composition can be adjusted to achieve advantageous physicochemical properties in liquid form, such as a suitable viscosity for the appropriate additive manufacturing platform; as well as advantageous physical properties in the solid glass form, such as a beneficial refractive index or transparency value etc.

The above Examples also demonstrate other advantageous features and technical benefits of the invention, such as in relation to environmental factors and sustainability for the use of water-based compositions, and energy conservation, for example, through the possibility of rapid heating cycles.

Although specific embodiments have been described, it would be apparent to the skilled person that modifications and variations are possible without departing from the spirit and scope of the invention, which is defined by the appended claims. As such, the appended claims intend to cover any such variations. Further, it would be apparent to the skilled person that many features described in relation to particular embodiments are combinable and envisaged for combination with features described in relation to other embodiments.

The invention claimed is:

1. A method for producing a solid body of glass comprising:
   providing a polymerisable composition comprising:
      a liquid composition comprising one or more organic polymerisable compound(s); and
      a solid source of silica as colloidal silica particles, silica glass microparticles and/or silica glass nanoparticles, dispersed in the liquid composition;
   curing the polymerisable composition to obtain a cured body;
   subjecting the cured body to thermal debinding to substantially remove the organic components in the cured body; and
   subjecting the cured body to sintering to obtain a solid body of glass,
   wherein the one or more organic polymerisable compound(s) comprise(s) at least one organosilicon compound as a second source of silica to thereby increase the silica loading of the cured body prior to sintering, wherein the organosilicon compound(s) is/are chosen from silicon-based preceramic polymers/monomers and silicon alkoxides.

2. The method of claim 1, wherein curing the polymerisable composition is performed by supplying energy to the composition and/or by putting the polymerisable composition in contact with a chemical curing agent.

3. The method of claim 1, wherein curing the composition is performed by providing thermal energy or electromagnetic radiation.

4. The method of claim 1, wherein the second source of silica is solubilisable in one or more organic solvents at operating temperature.

5. The method of claim 1, wherein the one or more organic polymerisable compound(s) comprises at least one curable compound.

6. The method of claim 1, wherein the cured body prior to sintering has a silica loading of at least 55 wt %.

7. The method of claim 1, wherein the weight loss between the cured body and the solid body of silica glass is at most 50 wt %.

8. The method of claim 1, wherein the composition comprises at least one organic polymerisable compound and/or at least one organic curable compound.

9. The method of claim 8, wherein the organic curable compound is a diacrylate, triacrylate, tetraacrylate or mixture of diacrylates and/or triacrylates and/or tetraacrylates.

10. The method of claim 1, wherein the composition is photopolymerisable.

11. The method of claim 1, wherein the colloidal silica particles are made from fumed silica.

12. The method of claim 1, wherein the silicon-based preceramic polymer is a polysiloxane, a polysilazane or a polycarbosilane.

13. The method of claim 1, wherein the silicon-based preceramic polymer is a methyl-phenyl-polysiloxane, a silicone acrylate, silicone methacrylate or a photocurable siloxane.

14. The method of claim 13, wherein the liquid composition comprises a curable silicon-based preceramic polymer and a curable organic polymer or monomer.

15. The method of claim 1, wherein the silicon alkoxide is chosen from one or more of tetraethyl orthosilicate (TEOS), methyltriethoxysilane, methyldiethoxysilane and tetramethyl orthosilicate.

16. The method of claim 1, wherein the liquid composition comprises a curable silicon-based preceramic polymer and/or a curable silicon alkoxide.

17. The method of claim 1, wherein the polymerisable composition comprises an organic solvent, and wherein the organic solvent is selected from toluene, phenoxyethanol, isopropanol, benzylalcohol.

18. The method of claim 1, further comprising shaping the cured body prior to or during curing.

19. The method of claim 18, wherein the cured body is shaped prior to curing by casting.

20. The method of claim 18, wherein the cured body is shaped during curing by selective polymerisation or simultaneous shaping and curing.

21. The method of claim 1, wherein the polymerisable composition comprises a metal or metalloid selected from the group consisting of Al, Ti, Zr, Ge, Ba, Zn, B, P and La.

22. The method of claim 1, wherein the polymerisable composition comprises up to 20 wt % of a metal or metalloid oxide precursor.

23. The method of claim 1, wherein the polymerisable composition comprises one or more of: zirconium propoxide, zirconium butoxide, germanium ethoxide, aluminium-tri-sec-butoxide, titanium butoxide, titanium ethoxide, titanium isopropoxide, barium acetate, zinc methoxide and zinc isopropoxide, boron ethoxide, boron butoxide, phosphorus ethoxide, phosphorus butoxide, lanthanum acetate hydrate, and lanthanum ethoxide.

24. A method for producing a shaped solid body of glass by additive manufacturing, the method comprising:
   providing a polymerisable composition comprising:
      a liquid composition comprising one or more organic polymerisable compound(s); and
      a solid source of silica as colloidal silica particles, silica glass microparticles and/or silica glass nanoparticles, dispersed in the liquid composition;
   wherein the one or more organic polymerisable compound(s) comprise(s) at least one organosilicon compound as a second source of silica, wherein the organosilicon compound(s) is/are chosen from silicon-based preceramic polymers/monomers and silicon alkoxides; and
   selectively curing the composition to obtain a cured body having a desired shape;

subjecting the cured composition to thermal debinding to substantially remove the organic components in the cured body; and subjecting the composition to sintering to obtain a solid body of glass.

* * * * *